United States Patent
Deligne et al.

(10) Patent No.: US 6,314,399 B1
(45) Date of Patent: Nov. 6, 2001

(54) APPARATUS FOR GENERATING A STATISTICAL SEQUENCE MODEL CALLED CLASS BI-MULTIGRAM MODEL WITH BIGRAM DEPENDENCIES ASSUMED BETWEEN ADJACENT SEQUENCES

(75) Inventors: Sabine Deligne, Yorktown Heights, NY (US); Yoshinori Sagisaka, Kyoto; Hideharu Nakajima, Nara, both of (JP)

(73) Assignee: ATR Interpreting Telecommunications Research, Kyoto (JP)

( * ) Notice: Subject to any disclaimer, the term of this patent is extended or adjusted under 35 U.S.C. 154(b) by 0 days.

(21) Appl. No.: 09/290,584

(22) Filed: Apr. 13, 1999

(30) Foreign Application Priority Data

Jun. 12, 1998 (JP) .................................................. 10-165030

(51) Int. Cl.$^7$ ...................................................... G10L 15/08
(52) U.S. Cl. .......................... 704/257; 704/255; 704/256; 704/240
(58) Field of Search ............................. 704/1, 4, 9, 257, 704/236, 250, 256, 255, 240

(56) References Cited

U.S. PATENT DOCUMENTS 5,987,404 * 11/1999 Pietra et al. .............................. 704/9
6,021,384 * 2/2000 Gorin et al. .............................. 704/1

OTHER PUBLICATIONS

Philip Clarkson et al., "Statistical language modeling using the cmu–cambridge toolkit," Proceedings of Eurospeech 97, pp. 2707–2710, 1997.

T. Kawahara et al., "Phrase language models for detection and verification–based speech understanding," Proceedings of 1997 IEEE workshop on Automatic Speech Recognitionand Understanding, pp. 49–56, 1997.

S. Deligne, "Language modeling by variable length sequences: theoretical formulation and evaluation of multigrams," ICASSP 1995, vol. 1, pp. 169–172, 1995.

(List continued on next page.)

Primary Examiner—William Korzuch
Assistant Examiner—Susan McFadden

(57) ABSTRACT

An apparatus generates a statistical class sequence model called A class bi-multigram model from input training strings of discrete-valued units, where bigram dependencies are assumed between adjacent variable length sequences of maximum length N units, and where class labels are assigned to the sequences. The number of times all sequences of units occur are counted, as well as the number of times all pairs of sequences of units co-occur in the input training strings. An initial bigram probability distribution of all the pairs of sequences is computed as the number of times the two sequences co-occur, divided by the number of times the first sequence occurs in the input training string. Then, the input sequences are classified into a pre-specified desired number of classes. Further, an estimate of the bigram probability distribution of the sequences is calculated by using an EM algorithm to maximize the likelihood of the input training string computed with the input probability distributions. The above processes are then iteratively performed to generate statistical class sequence model.

32 Claims, 4 Drawing Sheets

OTHER PUBLICATIONS

S. Deligne, "Interference of variable–length acoustic units for continuous speech recognition," ICASSP 1997, vol. 3, pp. 1731–1734, 1997.

Klaus Ries, et al, Interactive System Labs, Carnegie Mellon University, USA, University of Karlsruhe, Germany, pp. 398–401.

Hirokazu Masataki, et al, ATR Interpreting Telecommunications Research Labs, 1996 IEEE, pp. 425–429.

Shoichi Matsunaga et al, NTT Human Interface Labs, ESCA.Eurospeech 97, Rhodes, Greece. ISSN 1018–4074, pp. 2719–2723.

Sabine Deligne, et al, ENST–Dept. Signal & Dept. Informatique, CNRS–URA 820, 46 rue Barrault, 75634 Paris cedex 13, France, European Union.

Peter F. Brown, et al, Computational Linguistics, Dec. 1992, vol. 18, No. 4, pp. 467–478.

Sven Martin et al, ESCA. Eurospeech 95. $4^{th}$ European Conference on Speech Communications and Technology. Madrid, Sep. 1995. ISSN 1018–4074, pp. 1253–1256.

* cited by examiner

APPARATUS FOR GENERATING A STATISTICAL SEQUENCE MODEL CALLED CLASS BI-MULTIGRAM MODEL WITH BIGRAM DEPENDENCIES ASSUMED BETWEEN ADJACENT SEQUENCES

BACKGROUND OF THE INVENTION

1. Field of the Invention

The present invention relates to an apparatus for generating a statistical class sequence model called a class bi-multigram model from input strings of discrete-valued units, where bigram dependencies are assumed between adjacent sequences including first and second sequences, the first sequence consisting of a variable number of units $N_1$ and the second sequence consisting of a variable number of units $N_2$, and where class labels are assigned to the sequences regardless of their length, also relates to an apparatus for generating a statistical class language model which is applied from the apparatus for generating the statistical class sequence model, and further relates to a speech recognition apparatus using the apparatus for generating the statistical language model.

2. Description of the Prior Art

The role of a statistical language model in the context of speech recognition is to provide an estimate of the likelihood of any string of words. This likelihood value is used within a speech recognition system to help select the sentence most likely uttered by the speaker. A statistical language model specifies the kind of dependencies assumed between the words in a sentence. Based on the model's assumptions, the likelihood of a sentence can be expressed as a parametric function of the words forming the sentence. The language model is fully specified once all the parameters of the likelihood function have been estimated using a given optimization criterion. So far the most widely used language model is the so-called N-gram model (N being a natural number), where the assumption is made that each word in a sentence depends on the (N−1) preceding words. As a result of this assumption, the likelihood function of a sentence $W=w_1^L==w_1, w_2, \ldots, W_L$ is computed as follows:

$$P(w_1^L) = \prod_{t=1}^{L} P(w_t | w_{t+1-N}^{t-1}), \quad (1)$$

where wt is the t-th word in the sentence W. The parameters of the N-gram model are the conditional probabilities $p(w_{iN}|W_{i1}, W_{i2}, \ldots, W_{iN-1})$ for all the words $W_{i1}, \ldots, W_{iN}$ of the vocabulary. These conditional probabilities are usually estimated according to a Maximum Likelihood criterion, as the relative frequencies of all the N-uplets of words observed in some large training database. However, the size of the training database being necessary limited, all possible combinations of words cannot be observed a sufficient number of times to allow to collect reliable statistics.

One limitation of the N-gram model is the assumption of fixed length dependency between the words, which obviously is not a valid assumption for natural language data. Besides, increasing the value of N to capture longer spanning dependencies between the words and thus increase the predictive capability of the model results in considerably increasing the size of the model in terms of the number of N-gram entries, which makes it difficult to get reliable estimates for all N-gram probabilities and furthermore increases the complexity of the search algorithm during speech recognition.

As far as modeling assumptions are concerned, phrase based models can be either deterministic or stochastic. In a deterministic model, there is no ambiguity on the parse of a sentence into phrases, whereas in a stochastic model various ways of parsing a sentence into phrases remain possible. For this reason, stochastic models can be expected to evidence better generalization capabilities than deterministic models. For example, assuming that the sequence [bcd] is in the inventory of sequences of the model, then, in the context of a deterministic model, the string "b c d" will be parsed as being a single sequence "[bcd]". On the other hand, in the context of a stochastic model, the possibility of parsing the string "b c d" as "[b] [c] [d] ", "[b] [cd]" or "[bc] [d]" also remain. Class versions of phrase based models can be defined in a way similar to the way class version of N-gram models are defined, i.e., by assigning class labels to the phrases. In prior art it consists in first assigning word class labels to the words, and in then defining a phrase class label for each distinct phrase of word class labels. A drawback of this approach is that only phrases of the same length can be assigned the same class label. For example, the phrases "thank you" and "thank you very much" cannot be assigned the same class label, because being of different lengths, they will lead to different sequences of word class labels.

The following prior Art References disclose phrase based models and/or class phrase based models:

(a) Prior Art Reference 1: Klaus Ries et al., "Class phrase models for language modeling", Proceedings of ICSLP 96, 1996;

(b) Prior Art Reference 2: Hirokazu Masataki et al., "Variable-order n-gram generation by word class splitting and consecutive word grouping", Proceedings of ICASSP 96, 1996;

(c) Prior Art Reference 3: Shoichi Matsunaga et al., "Variable-length language modeling integrating global constraints", Proceedings of EUROSPEECH 97, 1997; and (d) Prior Art Reference 4: Sabine Deligne et al., "Introducing statistical dependencies and structural constraints in variable length sequence models", in Grammatical Inference: Learning Syntax from Sentences, Lecture Notes in Artificial Intelligence 1147, pp. 156–167, Springer 1996.

Prior Art References 1, 2 and 3 disclose deterministic models, wherein there is only one way to parse the input strings of units. This approach can be expected to demonstrate little generalization ability, because unseen test strings are forced to be parsed following the way the training strings were parsed, and this parsing may not any optimal one.

Prior Art References 1, 2 and 3 disclose models, the parameters of which are estimated with heuristic procedures, namely greedy algorithms where words are incrementally grouped into sequences, for which monotone convergence towards an optimum cannot be theoretically guaranteed.

Prior Art Reference 4 discloses a stochastic sequence model, where no means of classification is provided to assign class labels to the sequences.

Prior Art Reference 1 discloses a class sequence model, where the estimation of the sequence distribution and the assignment of the class labels to the sequences are performed independently, so that there is no guarantee that the estimation of the sequence distribution and the assignment of the class labels to the sequences are optimal with respect to each other.

Prior Art Reference 1 discloses a class sequence model, where sequences of the same length only can be assigned the same sequence class label. For example, the sequence "thank you for" and "thank you very much for" cannot share a common class model, because they are of different lengths.

SUMMARY OF THE INVENTION

An object of the present invention is to provide an apparatus for generating a statistical sequence model, which is capable of ensuring a monotone convergence toward an optimum state, having a degree of freedom in parsed results, allowing variable-length sequences to be treated as the same class.

Another object of the present invention is to provide an apparatus capable of generating a statistical model by practically high speed processing with a digital computer, as compared with the prior art.

A further object of the present invention is to provide a speech recognition apparatus comprising the above-mentioned apparatus for generating the statistical mode.

According to one aspect of the present invention, there is provided an apparatus for generating a statistical class sequence model called class bi-multigram model from input strings of discrete-valued units, where bigram dependencies are assumed between adjacent variable length sequences of maximum length N units, and where class labels are assigned to the sequences, characterized in that said apparatus comprises:

initialization means for taking as an input a training string of units, registering in an inventory of sequences all the combinations of 1 to N units occurring in the input string, counting the number of times all sequences of units occur and the number of times all pairs of sequences of units co-occur in the input training strings of units, computing an initial bigram probability distribution of all the pairs of sequences as the counted number of times the two sequences co-occur divided by the counted number of times the first sequence occurs in the input training string, and outputting the inventory of sequence and the initial bigram probability distribution of the sequences in the inventory;

classification means for taking as an input the inventory of sequences and the bigram probability distribution of the sequences in the inventory, classifying the input sequences into a pre-specified desired number of classes, by first assigning each sequence to its own class, by then repeatedly updating the class conditional probability distribution of the sequences and the bigram probability distribution of the classes and merging the pairs of classes for which the loss in mutual information computed with the current class probability distributions is minimal, until the desired number of classes is obtained, and outputting the inventory of sequences with the class label assigned to each sequence, the class conditional probability distribution of the sequences, and the bigram probability distribution of the classes;

reestimation means for taking as an input the training string of units, the inventory of sequences with the class label assigned to each sequence, the current class conditional probability distribution of the sequences, and the current bigram probability distribution of the classes which are outputted from said classification means, calculating an estimate of the bigram probability distribution of the sequences by using an EM algorithm to maximize the likelihood of the input training string computed with the input probability distributions, and outputting the inventory of sequences with the bigram probability distribution of the sequences, the process of said reestimation means being performed with a forward-backward algorithm, by using an equation where the bigram probability between the sequence to be processed and the preceding sequence is calculated from the forward likelihood of the input training string which can be taken forward in time series, the class conditional probability of the sequence to be processed, the probability of the class of the sequence to be processed knowing the class of the preceding sequence, and the backward likelihood of the input training string which can be taken backward in time series; and control means for controlling said classification means and said reestimation means to iteratively execute the process of said classification means and said reestimation means, the input of said classification means being, at the first iteration, the output of the said initialization means, and, during subsequent iterations, the output of said reestimation means, and the input of said reestimation means being the output of said classification means, until a predetermined ending condition is satisfied, thereby generating a statistical class sequence model.

In the above-mentioned apparatus for generating the statistical class sequence model, said initialization means preferably withdraws from the inventory of registered sequences, the sequences occurring a number of times which is less than a pre-specified number of times in the input training string of units.

In the above-mentioned apparatus for generating the statistical class sequence model, said classification means preferably classifies the sequences into a pre-specified number of classes by applying the Brown algorithm to an input bigram probability distribution of the sequences computed by said initialization means at the first iteration, and by said reestimation means during the subsequent iterations.

In the above-mentioned apparatus for generating the statistical class sequence model, said equation is preferably an equation for calculating the bigram probability between two sequences of units including first and second sequences, where the first sequences of units is followed by the second sequence of units which is a sequence of units to be processed, for each sequence of units to be processed in the input training string of units; and wherein the bigram probability between two sequences of units is obtained by dividing the sum of the likelihoods of all the segmentations containing the first and the second sequences of units, by the sum of the likelihoods of all the segmentations containing the first sequence of units.

In the above-mentioned apparatus for generating the statistical class sequence model, said equation preferably has a denominator representing the average number of occurrences of each sequence of units in the input training string of units, and a numerator representing the average number of co-occurrences of each pair of sequences of units where the first sequence of units is followed by the second sequence of units in the input training strings of units, wherein said numerator is the sum of the products of the forward likelihood of the input training string of units, the class conditional probability of the sequence to be processed, the probability of the class of the sequence to be processed conditioned by the class of the sequence preceding the sequence of units to be processed, and the backward likelihood of the input training string of units; and wherein said denominator is the sum for all the sequences in the inventory of the products of the forward likelihood of the input training string of units, the class conditional probability of the sequence, the probability of the class of the sequence conditioned by the class of the sequence preceding the sequence of units to be processed, and the backward likelihood of the input training string of units.

In the above-mentioned apparatus for generating the statistical class sequence model, the ending condition is preferably that iterations, each including of the process of said classification means and the process of said reestimation means, have been performed a pre-specified number of times.

According to another aspect of the present invention, there is provided an apparatus for generating a statistical language model, characterized in that said apparatus for generating the statistical language model comprises the above-mentioned apparatus for generating the statistical class sequence model, wherein the unit is a letter of an alphabet of a natural language, wherein the sequence is a morphem or a word, wherein said classification means classifies sequences of letters into a pre-specified number of classes of sequences of letters, and wherein said statistical sequence model is a statistical language model.

According to a further aspect of the present invention of the present invention, there is provided an apparatus for generating a statistical language model, characterized in that said apparatus for generating the statistical language model comprises the above-mentioned apparatus for generating the statistical class sequence model, wherein the unit is a word of a natural language, wherein the sequence is a phrase, wherein said classification means classifies phrases into a pre-specified number of classes of phrases, and wherein said statistical sequence model is a statistical language model.

According to a still further aspect of the present invention, there is provided a speech recognition apparatus comprising speech recognition means for recognizing speech by using a predetermined statistical lanquaqe model based on in input speech utterance, characterized in that said speech recognition apparatus comprises the above-mentioned apparatus for generating the statistical class sequence model, wherein said speech recognition means recognizes speech with reference to the statistical language model generated by said apparatus for generating the statistical language model based on an input speech utterance, and outputting a speech recognition result.

According to the present invention, there can be provided a statistical sequence model generating apparatus, a statistical language model generating apparatus and a speech recognition apparatus each of which is capable of ensuring a monotone convergence toward an optimum state, having a degree of freedom, allowing variable-length sequences to be treated as the same class, and performing practically high speed processing with a digital computer, as compared with the prior art.

Further, through speech recognition with the generated statistical language model, speech recognition with a higher speech recognition rate can be achieved, in comparison with the prior art.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention are described below with reference to the attached drawings.

These preferred embodiments are first described in the case where a unit is a character from an alphabet of a natural language, where a sequence is a sequence of characters and where a class is a class of sequences of characters. These preferred embodiments will then be described in a case where a unit is a word from the vocabulary of a natural language, where a sequence is a phrase and where a class is class of phrases. However the present invention is not limited to these cases, as it is also possible that a unit string be a DNA string, so that a sequence is a sequence of DNA and a class is a class of sequences of DNA. More generally, the present invention can be applied to generate a model for any data consisting of a string of discrete-valued units.

Figure 1:
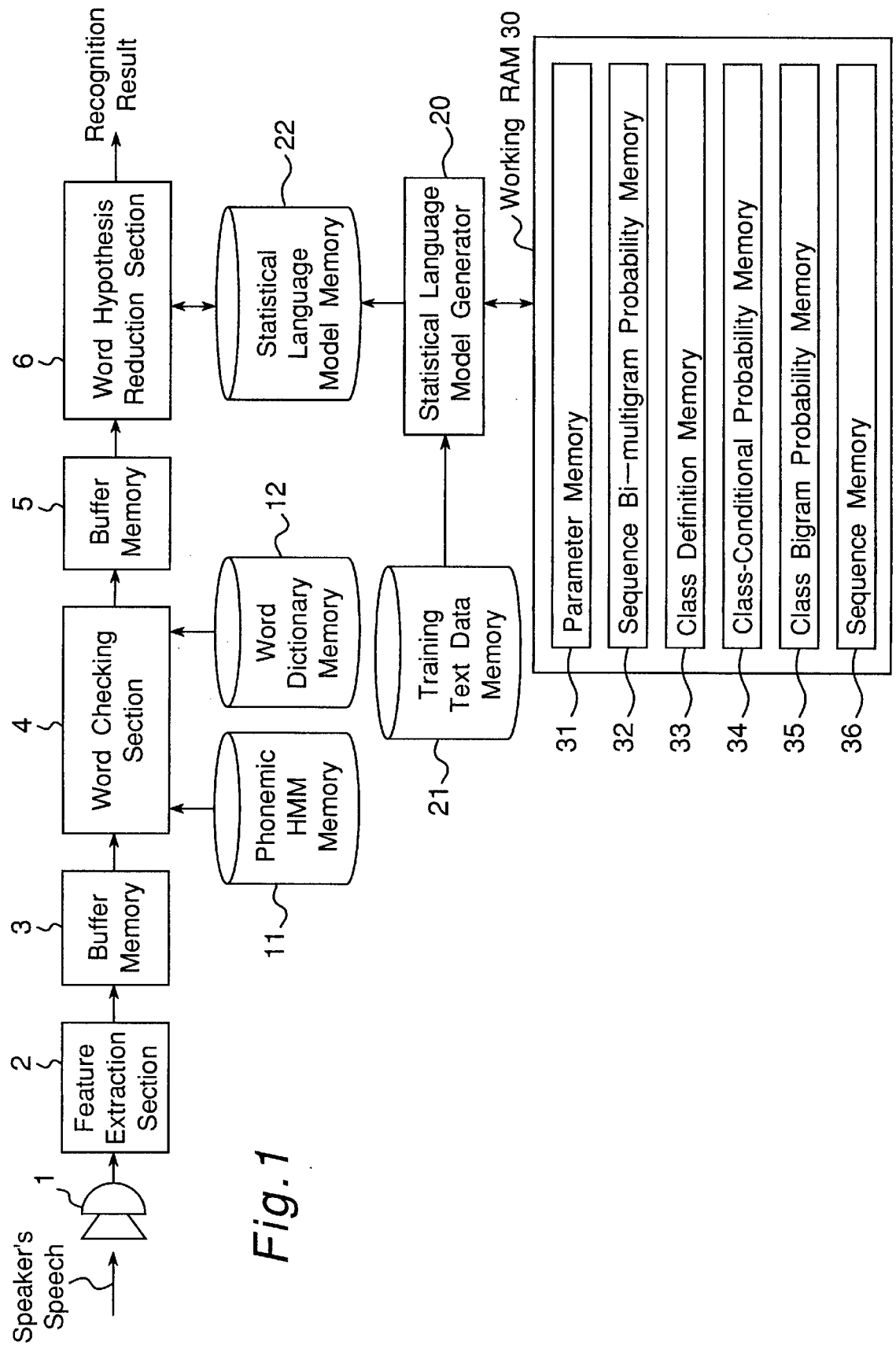
FIG. 1 is a block diagram of a continuous speech recognition apparatus which is a preferred embodiment according to the present invention.

FIG. 1 is a block diagram of a continuous speech recognition apparatus of a preferred embodiment according to the present invention. In FIG. 1, the continuous speech recognition system relies on a statistical language model generator 20, which generates a statistical class bi-multigam language model with a working RAM 30 based on natural language data which are strings of words stored in a training data memory 21. The statistical language model generator operates by following the iterative procedure shown in FIG. 3, which consists in altering at each iteration the estimation of the phrase distribution (at step S4) with the classification of the phrases (at step S3).

More specifically, the object of the preferred embodiments according to the present invention is to provide an apparatus for generating a statistical class sequence model called class bi-multigram model from input strings of discrete-valued units, where bigram dependencies are assumed between adjacent sequences including first and second sequences, the first sequence consisting of a variable number of units $N_1$ and the second sequence consisting of a variable number of units $N_2$, and where class labels are assigned to the sequences regardless of their length.

The preferred embodiments according to the present invention provide a way to generate a class bi-multigram model from an input string of units, by optimizing jointly the estimation of the bi-multigram distribution of the sequences and the classification of the sequences, this classification being performed regardless of the length of the sequences.

Figure 3:
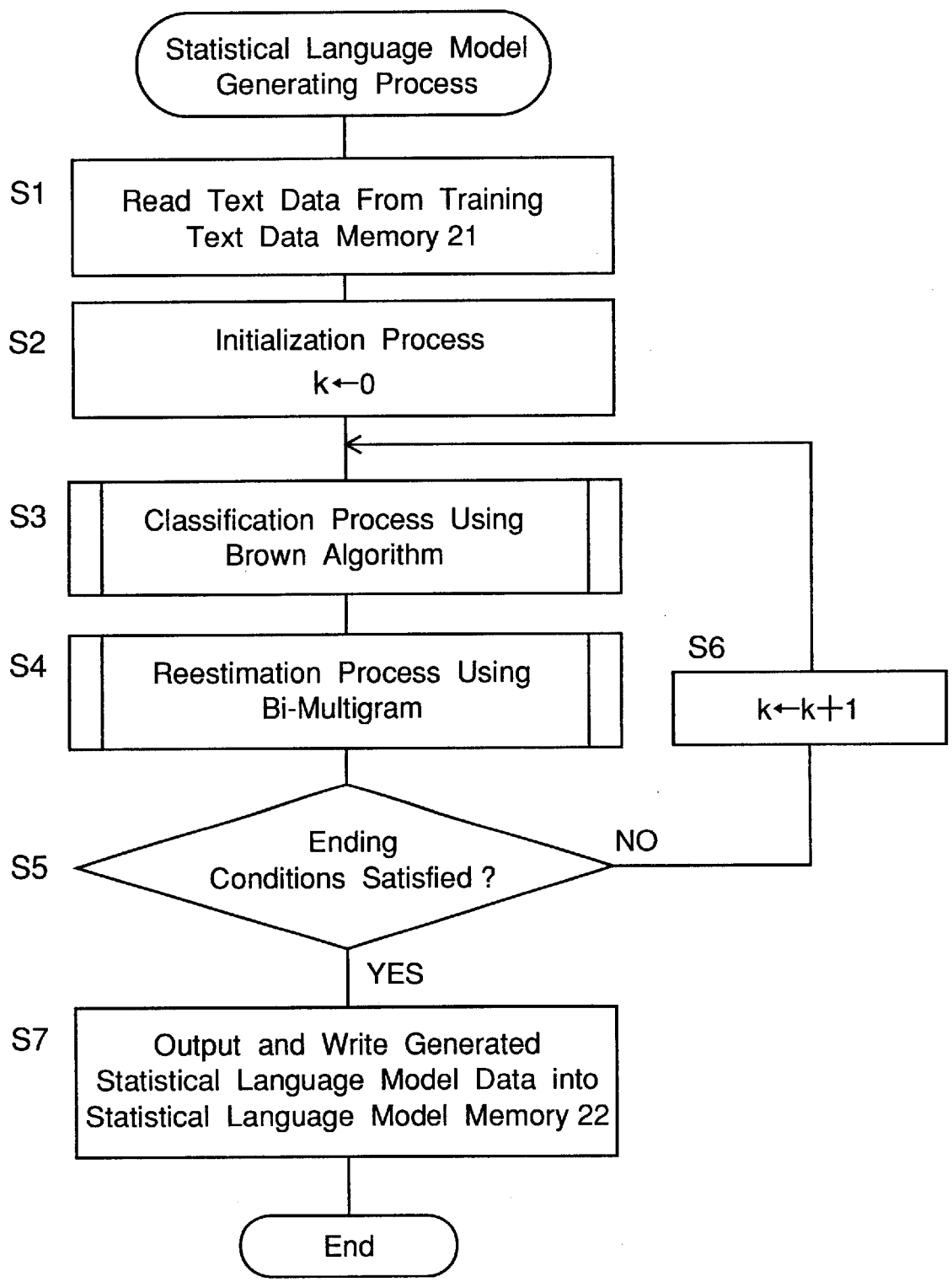
FIG. 3 is a flow chart showing a statistical language model generating process to be executed by a statistical language model generator 20 of FIG. 1.

In the preferred embodiments, summarizing speaking, the following processes are executed as shown in FIG. 3.

The learning procedure of the model is initialized (at step S2), by initializing the bi-multigram distribution of the sequences with the relative counts of all the combinations of 1 up to $n_{max}$ units which are observed more than a pre-specified number of times in the input training string of units.

Then, there is embedded the iterative estimation of the bi-multigram distribution of the sequences with their automatic classification (at step S3), where the classification takes as an input the current bi-multigram distribution of the sequences, and produces as an output a bigram distribution of sequence classes and a class conditional distribution of sequences by assigning a sequence class label to each sequence, according to a maximum likelihood criterion, the number of distinct class labels being pre-specified. In the preferred embodiments according to the present invention, this classification step relies on the Brown algorithm disclosed in Prior Art Reference 5, Peter. F. Brown et al., "Class based n-gram models of natural language", Computational Linguistics, Vol. 18, No. 4, 1992. However, the other classification algorithm can be used with present invention, especially the classification algorithm disclosed in prior art reference 6, Sven Martin et al, "Algorithms for bigram and trigram word clustering", Proceedings of 4th EUROSPEECH '95, pp. 1253–1256, Madrid, 1995.

Thereafter, the bi-multigram distribution of the sequences is reestimated (at step S4) according to a maximum likelihood criterion from the current bigram distribution of sequence classes and the current class conditional distribution of sequences, by using an EM (Expectation Maximization) procedure, and by setting to zero the bi-multigram probabilities of sequences the reestimated number of occurrences of which falls under a pre-specified threshold. The EM reestimation formula (Equation (15)) computes the bi-multigram probability between two sequences as the ratio of the expected number of co-occurrences of these two sequences and the expected number of occurrences of the first of these two sequence, the expectation being computed over all the possible parses of the input training string into sequences with the current bigram distribution of the sequence classes and the current class conditional distribution of the sequences. The number of co-occurrences of two sequences is computed by summing the likelihoods of the parses of the input training string of units where these two sequences co-occur as many times as these two sequences co-occur in these parses. The expected number of occurrence of a sequence is computed by summing the likelihoods of the parses of the input training string of units where this sequence occurs as many times as this sequence occurs in these parses.

Then, the above-mentioned EM formula is implemented with a forward-backward algorithm in order to reduce the T-exponential complexity (T is the number of units in the input string of units) of the EM procedure to a T-linear complexity. The forward backward algorithm (Equations (22) to (24)) consists in computing the expected number of co-occurrences of two sequences and the expected number of occurrences of the first of these two sequences, via a summation over the time index t of the units in the input training string of units, instead of a summation over the set of parses of the input string. The expected number of co-occurrences of two sequences is computed by summing over the time index t of the units in the input training string the cumulated likelihood of all the parses where these two sequences co-occur with the first sequence ending at time index t. The cumulated likelihood of all the parses, where two sequences co-occur with the first sequence ending at time index t, is computed as the product of a so-called forward likelihood, equaling the likelihood of the input string of units up to time index t and ending at t with the first sequence, and of a so-called backward likelihood, equaling the likelihood of the input string of units starting at time index t+1 with the second sequence and knowing that it is preceded by the first sequence. The expected number of occurrences of a sequence is computed by summing over the time index t of the units in the input training string the cumulated likelihood of all the parses where the sequence occurs ending at time index t. The cumulated likelihood of all the parses, where a sequence occurs ending at time index t, is computed as the product of a so-called forward likelihood, equaling the likelihood of the input string of units up to time index t and ending at t with the sequence, and of a so-called backward likelihood, equaling the likelihood of the input string of units starting at time index t+1 and knowing the sequence ending at time index t by which it is preceded.

Further, the learning procedure is stopped (at step S5) when the likelihood of the input training string stops increasing or after a pre-specified number of learning iterations, whichever comes first.

The present preferred embodiment of the present invention focuses on a class bi-multigram model, which relies on a stochastic class sequence based approach—as opposed to a deterministic gram based approach—and the parameters of this stochastic class sequence model are estimated according to a maximum likelihood criterion with an EM procedure. In sequence based approaches, input strings of units are structured into variable-length sequences, and probabilities are assigned to sequences, whereas in gram based approaches, probabilities are assigned to the units of the input string. In a stochastic approach, there remains an ambiguity on the parse of the strings into sequences, whereas in a deterministic approach, once an inventory of sequences together with their probabilities is defined, there remains no ambiguity on the parse of the strings. For example, assuming that the sequence [bcd] is in the inventory of sequences of the model, then, in the context of a deterministic model, the string "b c d" will be parsed as being a single sequence "[bcd]"; on the other hand, in the context of a stochastic model, the possibility of parsing the string "b c d" as "[b][c][d]", "[b][cd]" or "[bc][d]" also remains. As a result, stochastic models can be expected to demonstrate better generalization capabilities than deterministic models.

First of all, the theoretical formulation of the class bi-multigram model is explained. In the multigram framework, a sentence composed of T words, $$W = w_{(1)} w_{(2)} \ldots w_{(T)} \qquad (2)$$

is assumed to result from the concatenation of phrases, each of which has a maximum length of $n_{max}$ words. In this case, if S denotes a segmentation into $T_s$ phrases and $s_{(t)}$ denotes a phrase of time index (t) in the segmentation S, then the result of the segmentation S of W can be written as follows:

$$(W, S) = s_{(1)} \ldots s_{(Ts)} \qquad (3)$$

And the dictionary consisting of the inventory of all the phrases which can be formed by combining 1, 2, ... up to $n_{max}$ words from the vocabulary, is noted:

$$Ds = \{s_j\}_j \qquad (4)$$

The sentence likelihood is calculated as the sum of the likelihoods of all the possible segmentations as follows:

$$L(W) = \sum_{s \in \{s\}} L(W, S) \qquad (5)$$

In the decision-oriented version of the model, the sentence W is parsed according to the most likely segmentation, thus yielding the following approximation:

$$L^*(W) = \max_{S \in \{s\}} L(W, S) \quad (6)$$

Assuming n-gram dependencies between the phrases, the likelihood value of a particular segmentation S is calculated as follows:

$$L(W, S) = \prod_t p(s_{(t)} | s_{(t-n+1)} \dots s_{(t-1)}) \quad (7)$$

It is noted here that hereinafter the notation n represents the length of the dependencies between the phrases, and is used as the "n" of the conventional n-gram model, while the notation $n_{max}$ represents the maximum length of a phrase. An example of likelihood calculation is shown in the following equation, for the sentence of four words "abcd" and with a bi-multigram model ($n_{max}=3$, n=2) and the symbol # represents the empty sequence:

Likelihood of "abcd"=$P([a]|\#)p([b]|[a])p([c]|[b])p([d]|[c])$ +$p([a]|\#)p([b]|[a])p([cd]|[b])$ +$p([a]|\#)p([bc]|[a])p([d]|[bc])$ +$p([a]|\#)p([bcd]|[a])$ +$p([ab]|\#)p([c]|[ab])p([d]|[c])$ +$p([ab]|\#)p([cd]|[ab])$ +$p([abc]|\#)p([d]|[abc])$ (8)

Next, the estimation of the parameters of the model will be explained. An n-gram model of multigrams is fully defined by the set of parameters Θ consisting of the n-gram conditional probabilities relative to any combination of n phrases from the dictionary Ds:

$$\Theta = \{p(s_{in}|s_{i1} \dots S_{in-1}) | s_{i1} \dots s_{in} \in Ds\} \quad (9).$$

The estimation of the set of parameters Θ can be formulated as a maximum likelihood estimation from incomplete data where the unknown data, is the underlying segmentation S. Thus, iterative maximum likelihood estimates of the parameter Θ can be calculated through the EM (Expectation Maximization) procedure which has been already known to those skilled in the art. Let Q(k, k+1) be the following auxiliary function calculated with the likelihoods of the iterations k and k+1:

$$Q(k, k+1) = \sum_{S \in \{S\}} L^{(k)}(S|W) \log\{L^{(k+1)}(W, S)\}$$

As already known to those skilled in the art, if $$Q(k, k+1) \geq Q(k, k), \quad (11)$$

then
ti $L^{(k+1)}(W) \geq L^{(k)}(W)$.+tm (12)

Therefore, the reestimation equation at iteration k+1 of $$p^{(k+1)}(s_{in}|s_{i1}, \dots s_{in-1}) \quad (13)$$

can be derived directly by maximizing the auxiliary function Q(k, k+1) over the set of model parameters $\Theta^{(k+1)}$, under the set of the following constraints:

$$\sum_{s_{in} \in D_s} p(s_{in} | s_{i1} \dots s_{in-1}) = 1. \quad (14)$$

And it comes:

$$p^{(k+1)}(s_{in}|s_{i1}, \dots s_{in-1}) = p_a|p_b$$

where $$p_a = \left\{ \sum_{S \in \{S\}} c(s_{i1} \dots s_{in-1} s_{in'} S) \times L^{(k)}(S | W) \right\} \quad (15)$$

$$p_b = \left\{ \sum_{S \in \{S\}} c(s_{i1} \dots s_{in-1'} S) \times L^{(k)}(S | W) \right\},$$

where it is noted that the subscript of a subscript and the superscript of a superscript cannot be expressed and so the expression of lower-layer subscripts are omitted herein, and where $c(s_{i1} \dots s_{in}, S)$ is the number of occurrences of the combination of phrases $s_{i1} \dots s_{in}$ in the segmentation S. The reestimation equation (15) can be implemented by mean of a forward-backward algorithm (hereinafter, also referred to as FB method), as detailed later for bi-multigrams (n=2). In a decision-oriented scheme, the above-mentioned reestimation equation reduces to the following equation:

$$p^{(k+1)}(s_{in}|s_{i1}, \dots s_{in-1}) = \{c(s_{i1} \dots s_{in-1} s_{in} S^{*(k)})\}/\{c(s_{i1} \dots s_{in-1} S^{*(k)})\} \quad (16),$$

where $S^{*(k)}$, the sentence parse maximizing $L^{(k)}(S|W)$, is retrieved with a Viterbi algorithm. Since each iteration improves the model in the sense of increasing the likelihood $L^{(k)}(W)$, the procedure eventually converges to a critical point (possibly a local maximum). The set of parameters Θ can be initialized with the relative frequencies of all the phrase combinations observed in the training corpus, i.e., training text data.

Next, the clustering (classification process) of the variable-length phrases is explained. Recently, class-phrase based models have gained some attention, but usually like in Prior Art Reference 1, it assumes a previous clustering of the words. Typically, each word is first assigned a word-class label $C_k$, then variable-length phrases $[C_{k1}, C_{k2} \dots C_{kn}]$ of word-class labels are retrieved, each of which defines a phrase-class label which can be denoted as "$<[C_{k1}, C_{k2} \dots C_{kn}]>$". As a result, in this approach, only phrases of the same length can be assigned the same phrase-class label. For instance, the phrases "thank you for" and "thank you very much for" cannot be assigned the same class label. In the present preferred embodiment, it is proposed to address this limitation by directly clustering phrases instead of words. For this purpose, bigram dependencies are assumed between the phrases (n=2) and the bi-multigram leaning procedure as described above is modified so that each iteration consists of two steps:

(I) Step SS1: Class assignment (corresponding to step S3 of FIG. 3)

$$\{p^{(k)}(s_j|s_i)\} \rightarrow \{p^{(k)}(C_{k(sj)}|C_{k(si)}), p^{(k)}(s_j|C_{k(si)})\} \quad (17)$$

(II) Step SS2: Multigram reestimation (corresponding to step S4 of FIG. 3)

$$\{p^{(k)}(C_{k(sj)}|C_{k(si)}), p^{(k)}(s_j|C_{k(sj)})\} \to \{p_{(k+1)}(s_j|s_i)\} \quad (18)$$

The above-mentioned Step SS1 takes the bigram distribution of the phrases as an input, and outputs a bigram distribution of phrase classes and a class conditional distribution. The class assignment is performed by maximizing the mutual information between adjacent phrases according to, for example, Prior Art Reference 5, "P. F. Brown et al., "Class-based n-gram models of natural language", Computational Linguistics, Vol. 18, No. 4, pp. 467–479, 1992", with the modification that candidates to clustering are phrases instead of words. As described above, $\{p^{(0)}(s_j|s_i)\}$ is initialized using the relative frequencies of the phrase co-occurrences observed in the training text data. The above-mentioned step SS2 includes of a step of reestimating the bigram distribution of the phrases using the multigram reestimation equation (Equation (15)) or its approximation equation (Equation (16)), with the only difference that the likelihood of a parse is now calculated as follows:

$$L(W,S) = \prod_i \left( p(C_{k(s(t))}|C_{k(s(t-1))}) \right) p(s_{(t)}|C_{k(s(t))}) \quad (19)$$

This is equivalent to reestimating the probability $p^{(k+1)}(s_j|s_i)$ from the probability $p^{(k)}(C_{k(si)}|C_{k(si)}) \times p^{(k)}(s_j|C_{k(sj)})$, instead of $p^{(k)}(s_j|s_i)$ as described above.

In summary, the step SS1 ensures that the class assignment based on the mutual information criterion is optimal with respect to the current phrase distribution, and the step SS2 ensures that the bigram distribution of the phrases optimizes the likelihood calculated according to Equation (19) with the current class distribution. The training data are thus iteratively structured at a both paradigmatic and syntagmatic level in a fully integrated way (the terms paradigmatic and syntagmatic are both linguistic terms). That is, the paradigmatic relations between the phrases expressed by the class assignment influence the reestimation of the bigram distribution of the phrases, while the bigram distribution of the phrases determines the subsequent class assignment.

In the present preferred embodiment, as described above, the forward-backward algorithm (FB method) is used for the estimation of bi-multigram parameters. This is explained in detail below.

The above-mentioned Equation (15) can be implemented at a complexity of $O(n_{max}^2 T)$, which is the degree of complexity, with $n_{max}$ the maximal length of a sequence and T the number of words in the corpus (training text data), using a forward-backward algorithm. It is noted that the complexity $O(n_{max}^2 T)$ corresponds to the order of calculating cost, that is, the calculating cost of the Equation (15) is proportional to the square of the maximal length $n_{max}$ of the sequence and proportional to the size of the corpus. The present preferred embodiment, basically, includes a step of calculating the numerator and the denominator of the Equation (15) by summing over the time index (t) of the words, instead of summing over the set of segmentations $\{S\}$. This calculation relies on the definition of the following forward variable $\alpha(t, l_i)$ and backward variable $\beta(t, l_j)$:

$$\alpha(t, l_i) = L(W_{(t)}^{(0)}|[W_{(t-li+l)}^{(0)}]) \quad (20)$$

$$\beta(t, l_j) = L(W_{(t+l)}^{(0)}|[W_{(t-lj+l)}^{(0)}]) \quad (21)$$

The forward variable $\alpha(t, l_i)$ represents the likelihood of the first t words, where the last $l_i$ words are constrained to form a sequence. On the other hand, the backward variable $\beta(t, l_j)$ represents the conditional likelihood of the last (T−t) words, where the last (T−t) words are preceded by the sequence $[w_{(t-lj+1)} \ldots w_{(t)}]$.

Assuming that the likelihood of a parse is calculated according to Equation (7) with n=2, the Equation (15) can be rewritten as follows:

$$p^{(k+1)}(s_j|s_i) = p_c|p_d \quad (22),$$

where $$p_c = \sum_{t=1}^{T} \alpha(t, l_i) p^{(k)}(s_j|s_i) \beta(t+l_j, l_j) \delta_i(t-l_i+1) \delta_j(t+1)$$

where $l_i$ and $l_j$ denote the lengths of the $$p_d = \sum_t \alpha(t, l_i) \beta(t, l_i) \delta_i(t-l_i+1)$$

sequences $s_i$ and $s_j$, respectively, and where the Kronecker function $\delta_k(t)$ equals to one if the word sequence starting at time index t is $s_k$, and zero otherwise.

The variables $\alpha$ and $\beta$ can be calculated according to the following recursion equations (or repetitive equations), where start and end symbols are assumed at time indices t=0 and t=T+1, respectively: for $1 \leq t \leq T+1$:

$$\alpha(t, l_i) = \sum_{l=1}^{n_{max}} \alpha(t-l_i, l) p([W_{(t-li+1)}^{(t)}]|[W_{(t-li-l+1)}^{(t-li)}]), \quad (25)$$

where $$\alpha(0, 1)=1, \alpha(0, 2)=\ldots=\alpha(0, n_{max})=, \quad (26);$$

for $0 \leq t \leq T$:

$$\beta(t, l_j) = \sum_{l=1}^{n_{max}} p([W_{(t+1)}^{(t+1)}]|[W_{(t-lj+1)}^{(t)}]) \beta(t+l, l), \quad (27)$$

where $$\beta(T+1, 1)=1, \text{ and } \beta(T+1, 2) \ldots = \beta(T+1, 1 n_{max})=0. \quad (28).$$

In the case where the likelihood of a parse or parsed result is calculated with the class assumption, i.e., according to Equation (19), the term $p^{(k)}(s_j|s_i)$ in the reestimation equations (Equations (22) to (24)) should be replaced by its class equivalent, i.e., by $p^{(k)}(C_{k(sj)}|C_{k(si)}) p^{(k)}(s_j|C_{k(sj)})$. In the recursion equation (25) of $\alpha$, the term $p([W_{(t-li+l)}^{(t)}][W_{(t-li-l+1)}^{(t-li)}])$ is replaced by the corresponding class bigram probability multiplied by the class conditional probability of the sequence $[W_{(t-li+1)}^{(t)}]$. A similar change is made also for the variable $\beta$ in the recursion equation (27).

Next, the reestimation process using the forward-backward algorithm in the present preferred embodiment is illustrated with an example.

The forward-backward direction reestimation equation consists in arranging the terms in the sum of Equation (15), so that the sum at the numerator and the sum at the denominator in the Equations (23) and (24) are calculated over the time index t of the units in the training data, instead of being calculated the set of possible parses $\{S\}$. This approach relies on the definition of a forward variable $\alpha$ and of a backward variable $\beta$.

(a) In the paragraph <<A1>> below, it is assumed that there are no classes.

(b) In the paragraph <<A1.1>> below, a definition and examples for the variables α and β are given.

(c) In the paragraph <<A1.2>> below, an example of a forward-backward reestimation of a bi-multigram probability, using the variables α and β, is given.

(d) In the paragraph <<A1.3>> below, an example of how to calculate the variables α and β by recursion is given.

(e) In the paragraph <<A2>> below,, it is shown how to modify the paragraphs <<A1.2>> and <<A1.3>> in the case where there are classes.

(f) All the examples below are based on data shown in the following Table 1.

TABLE 1

| Input training data (below): | | | | | | | | | | | | | | | | | | | | | | | | |
|---|---|---|---|---|---|---|---|---|---|---|---|---|---|---|---|---|---|---|---|---|---|---|---|---|
| o | n | e | s | i | x | o | n | e | e | i | g | h | t | s | i | x | t | h | r | e | e | t | w | o |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Time index of the units (above): | | | | | | | | | | | | | | | | | | | | | | | | |

Note:
Each letter of the training data corresponds to a district time index.

<<A1.1>> Definition of the Forward Variable α, and of the Backward Variable β:

The variable α(t, l) is the likelihood of the data up to the time index (t), ending with a sequence of length l. In the example of Table 1, the variable α(9, 3) is the likelihood of the string "o n e s i x o_n_e", where o_n_e is a sequence.

The variable β(t, l) is the conditional likelihood of the data starting at the time index (t+1), knowing that the sequence of length l ending at the time index (t). In the example of Table 1, the variable β(9, 3) is the likelihood of the string "e i g h t s i x t h r e e t w o", knowing that it is preceded by the string "o_n_e".

Examples of how to calculate the variables α and β by recursion are given in paragraph <<A1.3>> below.

<<A1.2>> Reestimation of the Bi-multigram Probability with the Variables α and β

The reestimation equation of the bi-multigram probability $p(o\_n\_e|s\_i\_x)$ using the variables α and β on the example training data of Table 1 is explained. In the general reestimation equation (15) of the bi-multigram probability $p(o\_n\_e|s\_i\_x)$, (a) the numerator is the average number of times the string "o_n_e" follows the string "s_i_x" in the training data; and (b) the denominator is the average number of times the string "s_i_x" occurs in the training data; and (c) the average being taken over all possible parses into sequences of the training data.

The numerator (Equation (23)) and the denominator (Equation 24) of the forward-backward reestimation equations (Equations (22) to (24)) are equal to the numerator and the denominator, respectively, of the Equation (15), however, they are calculated by summing over the time index t, instead of summing over the set of parses. In the numerator of the reestimation equation (Equation (15)), the likelihood of each possible parse is summed up as many times as the two sequences "s_i_x" and "o_n_e" co-occur, and follow each other in this parse. In the forward-backward reestimation equation (23), the likelihood values of all the parses where the two sequences "s_i_x" and "o_n_e" co-occur and follow each other, and where the string "o_n_e" begins at the time index (t+1) are first grouped and summed up, and then, the sum is completed by summing over the time index t.

In the above-mentioned example, the two sequences "s_i_x" and "o_n_e" co-occur and follow each other, with the string "o_n_e" starting at the time index (7) only. The sum of the likelihood values of all the parses where the two sequences "s_i_x" and "o_n_e" occur and follow each other, and where the string "o_n_e" begins at the time index (7) is the likelihood of the string "o n e s_i_x o_n_e e i g h t s i x t h r e e t w o", and this is equal to the following equation:

$$\beta(6, 3) \times p^{(k)}(o\_n\_e|s\_i\_x) \times \beta(9, 3) \qquad (29),$$

where the second term $p(o\_n\_e|s\_i\_x)$ is the bi-multigram probability at iteration (k). By definition of the forward variable α, the variable α(6, 3) is the likelihood of the string "o n e s_i_x", and by definition of the backward variable β, the variable β(9,3) is the likelihood of the string "e i g h t s i x t h r e e t w o" knowing that it is preceded by the string "o_n_e".

In the denominator of the Equation (15), the likelihood of each possible parse is summed up as many times as the string "s_i_x" occurs in this parse. In the equivalent forward-backward formulation, the likelihood values of all the parses where the string "s_i_x" occurs, and ends at the time index (t) are first grouped and summed up, and then, the sum is completed by summing over the time index t.

In the above-mentioned example, the string "s_i_x" occurs ending at the time index (6), and ending at the time index (17). The sum of the likelihood values of all the parses where the string "s_i_x" occurs ending at the time index (6) is the likelihood of the string "o n e s_i_x o n e e i g h t s i x t h r e e t w o", and this is equal to the following equation:

$$\alpha(6, 3) \times \beta(6, 3) \qquad (30).$$

Since, by definition of the forward variable α, the variable α(6, 3) is the likelihood of the string "o n e s_i_x", and by definition of the backward variable β, the variable β(6, 3) is the likelihood of the string "o n e e i g h t s i x t h r e e t w o", knowing that it is preceded by the sequence "s_i_x".

The sum of the likelihood values of all the parses where the string "s_i_x" occurs ending at the time index (17) is the likelihood of the string "o n e s i x o n e e i g h t s_i_x t h r e e t w o", and this is equal to the following equation:

$$\alpha(17, 3) \times \beta(17, 3) \qquad (31).$$

Since, by definition of the forward variable α, the variable α(17, 3) is the likelihood of the string "o n e s i x o n e e i g h t s_i_x", and by definition of the backward variable β, the variable β, (17, 3) is the likelihood of the string "t h e e t w o", knowing that it is preceded by the sequence "s_i_x".

As a result, the forward-backward reestimation equation for the bi-multigram probability $p(o\_n\_e|s\_i\_x)$ at iteration (k+1) on the training data "o n e s i x o n e e i g h t s i x t h r e e t w o" is as follows:

$$p^{(k+1)}(o\_n\_e|s\_i\_x) = p_e/p_f \qquad (32),$$

where $$p_e = \alpha(6, 3) \times p^{(k)}(o\_n\_e | s\_i\_x) \times \beta(9, 3) \quad (33),$$

and $$p_f = \alpha(6, 3) \times \beta(6, 3) + \alpha(17, 3) \times \beta(17, 3) \quad (34).$$

As described above, characteristics of the preferred embodiment of the present invention exist in the formulating Equation (22) including the Equations (23) and (24) by using the forward-backward algorithm, where the characteristic equations have the following meanings.

These equations are intended to calculate bigram probabilities between sequences of unit where a first sequence is followed by a second sequence, which is the relevant sequence to be processed, in the input data; and The bigram probabilities between the sequences can be obtained by dividing the sum of the likelihoods of all the segmentations where the first and second sequences co-occur and follow each other, by the sum of the likelihoods of all the segmentations where the sequence occurs.

In other words, the above-mentioned equation has a denominator which represents the average number of times the first sequence occurs in the input data, and a numerator which represents the average number of times the first sequence is followed by the second sequence in the input data, wherein the numerator is the sum of the products of the forward likelihood, the bi-multigram probability of the relevant sequence (to be processed) conditioned by the sequence preceding the relevant sequence (to be processed), and the backward likelihood, and this for all the sequences to be processed, and wherein the denominator is the sum of the products of the forward likelihood, and the backward likelihood, for each sequence to be processed.

<<A1.3>> An example of calculation of the forward variable $\alpha$, and of the backward variable $\beta$:

As an example, the variable $\alpha(9, 3)$ and the variable $\beta(9, 3)$ on the data "o n e s i x o n e e i g h t s i x t h r e e t w o" are calculated below.

In this case, the variable $\alpha(9, 3)$ is the likelihood of the string "o n e s i x o_n_e", and the variable $\beta(9, 3)$ is the conditional likelihood of the string "e i g h t s i x t h r e e t w o" knowing that it is preceded by the string "o_n_e".

The likelihood (forward variable) $\alpha(9, 3)$ is calculated by summing the following terms (a), (b), (c), (d), and (e), where it is assumed that the maximum length of a sequence is $n_{max}=5$:

$\alpha(9, 3)$ = the sum of the following values:

(a) $\alpha(6, 5) \times p(o\_n\_e | n\_e\_s\_i\_x)$ (b) $\alpha(6, 4) \times p(o\_n\_e | e\_s\_i\_x)$ (c) $\alpha(6, 3) \times p(o\_n\_e | s\_i\_x)$ (d) $\alpha(6, 2) \times p(o\_n\_e | i\_x)$ (e) $\alpha(6, 1) \times p(o\_n\_e | x)$ (35).

The backward likelihood (backward variable) $\beta(9,3)$ knowing that the string is preceded by the sequence "o_n_e" is calculated by the following equation:

$\beta(9,3)$ = the sum of the following values:

(a) $p(e\_i\_g\_h\_t | o\_n\_e) \times \beta(9+5, 5)$ (b) $p(e\_i\_g\_h | o\_n\_e) \times \beta(9+4, 4)$ (c) $p(e\_i\_g | o\_n\_e) \times \beta(9+3, 3)$ (d) $p(e\_i | o\_n\_e) \times \beta(9+2, 2)$ (e) $p(e | o\_n\_e) \times \beta(9+1, 1)$ (36)

<<A2>> Examples of Classes:

In the case where the sequences belong to classes, the variables $\alpha$ and $\beta$ are calculated by replacing the bigram probability term in the above-mentioned example as follows:

(a) $p(o\_n\_e | n\_e\_s\_i\_x)$ is replaced by p(class of o_n_e|class of n_e_s_i_x)×p(o_n_e|class of o_n_e);

(b) $p(o\_n\_e | e\_s\_i\_x)$ is replaced by p(class of o_n_e|class of e_s_i_x)×p(o_n_e|class of o_n_e);

(c) $p(o\_n\_e | s\_i\_x)$ is replaced by p(class of o_n_e|class of s_i_x)×p(o_n_e|class of o_n_e);

(d) $p(o\_n\_e | i\_x)$ is replaced by p(class of o_n_e|class of i_x)×p(o_n_e|elclass of o_n_e);

(e) $p(o\_n\_e | x)$ is replaced by p(class of o_n_e|class of x) ×p(o_n_e|class of o_n_e);

(f) $p(e\_i\_g\_h\_t | o\_n\_e)$ is replaced by p(class of e_i_g_h_t|class of o_n_e)×p(e_i_g_h_t|class of e_i_g_h_t);

(g) $p(e\_i\_g\_h | o\_n\_e)$ is replaced by p(class of e_i_g_h|class of o_n_e)×p(e_i_g_h|class of e_i_g_h);

(h) $p(e\_i\_g | o\_n\_e)$ is replaced by p(class of e_i_g|class of o_n_e)×p(e_i_g|class of e_i_g);

(i) $p(e\_i | o\_n\_e)$ is replaced by p(class of e_i|class of o_n_e)×p(e_i|class of e_i); and (j) $p(e | o\_n\_e)$ is replaced by p(class of e|class of o_n_e) ×p(e|class of e).

Process for Generating Statistical Language Model

FIG. 3 is a flow chart showing a process for generating a statistical language model which is executed by the statistical language model generator 20 of FIG. 1. In this case, as shown in FIG. 1, the statistical language model generator 20 comprises a working RAM 30 divided into the following memories 31 to 36:

(a) parameter memory 31 which is a memory for storing various set of parameters to be used in this generation process;

(b) sequence bi-multigram probability memory 32 which is a memory for storing the estimate of the bi-multigram probability of each sequence;

(c) class definition memory 33 which is a memory for storing the class assignments of the sequences;

(d) class-conditional probability memory 34, which is a memory for storing the conditional probabilities of the sequences knowing that the class to which they belong;

(e) class-bigram probability memory 35 which is a memory for storing the bigram probabilities of the class; and (f) sequence memory 36 which is a memory for storing the inventory of sequences.

Referring to FIG. 3, first of all, at step S1, the text or corpus data is read out from the training text data memory 21. The inputted training text data consists of strings of discrete units, where for example, each unit is a letter or a character, and a sequence is a word or a sequence of characters. Also, the following inputted parameters are previously set and stored in the parameter memory 31:

(a) maximum length of a sequence (i.e., the number of units);

(b) number of classes;

(c) threshold value for the discarded sequences (i.e., the minimum number of occurrences below which a sequence is discarded; and (d) ending condition, where the ending condition is the maximum number of iterations.

Then, at step S2, the initialization process is executed. With the inputted training text data, the frequencies of the sequences made of 1, 2, . . . , up to $n_{max}$ units are counted and, based on the counting result, the bi-multigram probability of each sequence is initially set. Sequences occurring a number of times less than a predetermined threshold value are discarded. Then, the iteration counter k is set to zero.

Next, at step S3, the classification process using the Brown algorithm is executed. In this classification process, sequence class labels are assigned to the sequences so that the loss of the mutual information amount between the classes be minimized, based on the bi-multigram probabilities of the sequences of iteration k, and then, the resulting bigram distribution of the classes and the class conditional distribution of the sequences are outputted to the memories 32 to 35 and stored therein. The classification criterion for this process is the mutual information between adjacent sequences, and the aforementioned algorithm is used. The aforementioned algorithm has been proposed by Brown et al. for application to words. Though the invention is presently explained with the use of the Brown algorithm, the present invention allows the use of any other classification algorithms based on a bigram distribution.

Next, at step S4, the reestimation process of the bi-multigram distribution is executed by using the Equations (22) to (24) obtained with reference to the forward-backward algorithm. In this process, based on the class assignment, the class-conditional distribution of the sequences and the bigram distribution of the classes of iteration k (counted at the preceding step S3), the bi-multigram probabilities of the sequences at iteration (k+1) are reestimated and calculated so as to maximize the likelihood of the training data, and then, resulting bi-multigram probabilities are outputted to the sequence bi-multigram probability memory 32 and are stored therein.

Next, at step S5, it is decided whether or not the predetermined ending condition is satisfied. If NO is decided, the iteration k is incremented by one at step S6, followed by iteration of steps S3 and S4. On the other hand, if YES is decided at step5, then the generated statistical language model is outputted to the statistical language model memory 22 and is stored therein. The statistical language model specifies the followings:

(a) the inventory of sequences;
(b) the class assignments of the sequences; and
(c) the bigram distribution of the classes and the class-conditional distribution of the sequences.

Figure 4:
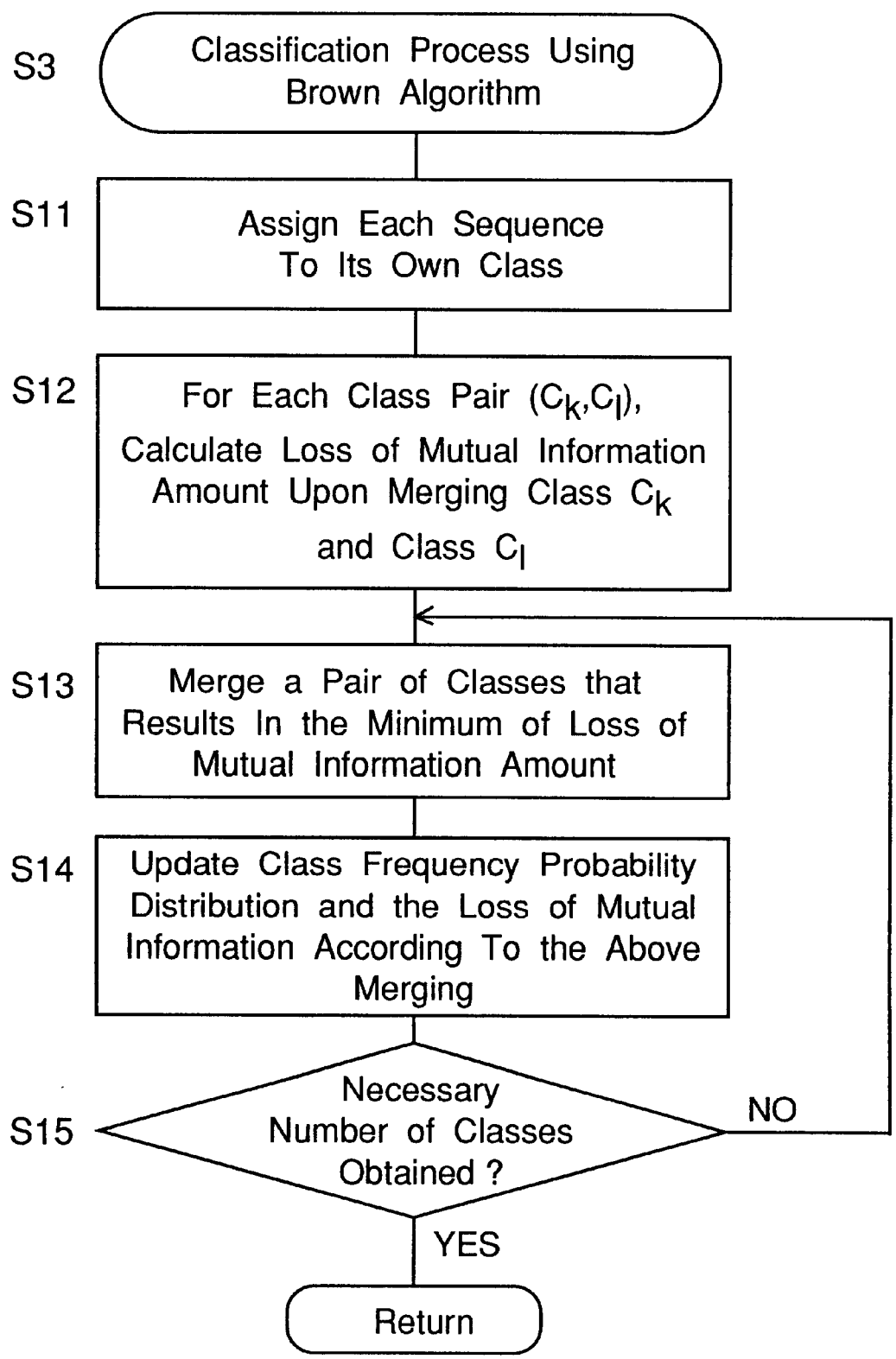
FIG. 4 is a flow chart showing a classification process using Brown algorithm, which is a subroutine of FIG. 3.

FIG. 4 is a flow chart showing the classification process using the Brown algorithm, which is a subroutine of FIG. 3. An algorithm has been proposed by Brown et al. (See, for example, Prior Art Reference 5) for the automatic classification of words, and this algorithm is extended in the present preferred embodiment for the automatic classification of sequences. Brown et al. have shown that for the purpose of automatic classification, the likelihood of the data is equivalent to maximizing the mutual information between adjacent classes. They have proposed a greedy algorithm that takes a bigram distribution of words as an input, and outputs a class assignment and the class distributions. The present inventor applies this algorithm by using the bi-multigram distribution of the sequences as the input distribution. The output is the class assignment and the class distributions.

The word algorithm based on the mutual information criterion used in the present invention is described in the paper by Brown et al. In this case, a method for maximizing the mutual information amount between classes is explained as a method for classifying words based on adjacent words. The clustering process based on mutual information amount is theoretically founded on the fact that the most likely method for dividing words into classes with a bigram class model is the class assignment that maximizes the average mutual information amount of adjacent classes. The N-gram class model is defined as a language model that approximates a word N-gram in combinations of occurrence distributions of word-class N-grams and class-based words as shown by the following equation (this equation becomes equivalent to an HMM equation in morphological or morphemic analysis if word classes are replaced by parts of speech. Therefore, this word classification method could be considered as a method for automatically determining an optimal system of parts of speech):

$$P(w_i|w_1^{i-1}) \approx P(w_i|c_i)P(c_i|c_{i-n+1}^{i-1}) \tag{37}$$

Now, it is assumed that V words are classified into C classes by using a function $\pi$ that maps a word $w_i$ into a class $c_i$. Given a training text $t_1^T$, the function $\pi$ may appropriately be determined so as to maximize the followings:

$$P(t_2^T|t_1) = P(T_2|T_1)P(t_3|t_2) \ldots P(t_T|t_{T-1}).$$

Although details are omitted, the following relational equation holds between the logarithmic likelihood $L(\pi)$ for each word, the entropy $H(w)$ of words and the average mutual information amount $I(c_1; c_2)$ of adjacent classes:

$$\begin{aligned}
L(\pi) &= (T-1)^{-1} \log P(t_2^T | t_1) \tag{38}\\
&= \sum_{w_1, w_2} \{C(w_1 w_2)\}/(T-1) \times \log P(c_2 | c_1) P(w_2 | c_2)\\
&\approx \sum_{c_1, c_2} P(c_1 c_2) \log\{P(c_2 | c_1)/P(c_2)\} +\\
&\quad \sum_w P(w) \log P(w)\\
&= I(c_1; c_2) - H(w)
\end{aligned}$$

Since $H(w)$ is not dependent on the division $\pi$, $L(\pi)$ can be maximized by maximizing $I(c_1; c_2)$. At present, there has been known no algorithm for determining a division that maximize be average mutual information amount. However, even the following greedy algorithm used in the present preferred embodiment could afford to obtain quite interesting clusters. A method for generating clusters having an inclusive relation like this is called hierarchical clustering. In contrast to this, a method for generating clusters having no overlaps as in k-mean algorithm is called non-hierarchical clustering.

Iterating the following merging process (V−1) times causes all the words to result in one class. That is, from the order in which the classes are merged, two branch trees having words as leaves are formed:

(1) Every word is assigned one class:
(2) Selecting from two possible class combinations a combination that maximizes the loss of the average mutual information amount, and merging these into one class; and
(3) Iterating the above step (2) (V-C) times allows C classes to be obtained.

A hierarchical structure representing processes for forming clusters, which is commonly called a dendrogram, can be used instead of the thesaurus in natural language processing. Simply thinking, this semi-optimum algorithm requires an amount of calculation of $V^5$ relative to the vocabulary V. However, taking advantages of the facts that (1) it is required only to determine the change in information amount as a result of merging two clusters, and that (2) the mutual information amount would change only partly out of the entirety as a result of the merging of two clusters, the calculation cost involved results in one for the calculation of $O(V^3)$, i.e., a cost on the order proportional to a cube of the number of iteration V.

The classification (i.e., clustering) process of the sequences is illustrated in FIG. 4. Explanations relating to FIG. 4 are as follows.

At step S11, each sequence is assigned to its own single class. Therefore, the initial bigram distribution of the classes equals to the bi-multigram distribution of the sequences, and the class conditional probability of each sequence equals to one as follows:

$$P(s_i|C_i)=1 \qquad (39).$$

At step S12, for every pair of classes, the loss in mutual information between adjacent words, when merging the two classes, is computed. Then each iteration of the clustering process includes the following steps S13 to S15. At step S13, a step is executed for merging the two classes for which the loss in mutual information is minimal, and step S14, a step is executed for updating the class distributions stored in the probability memories 34 and 35, and the loss values after the merge is performed. Thereafter, at step S15, a step is executed for deciding either to stop the clustering process if the desired number of classes is obtained, or to go to step S13 again if not.

Speech Recognition Apparatus

Next, constitution and operation of the speech recognition apparatus shown in FIG. 1 will be described.

Referring to FIG. 1, a phonemic hidden Markov model (hereinafter, hidden Markov model will be referred to as HMM) within a phonemic HMM memory 11 connected to a word checking or verifying section 4 is expressed including various statuses, each status having the following information:

(a) status number;
(b) acceptable context class;
(c) a list of preceding status and succeeding status;
(d) parameters of output probabilities density distribution; and
(e) self transition probability and transition probability to succeeding status.

In addition, the phonemic HMM used in the present preferred embodiment, for which it is necessary to discriminate which speaker each distribution is derived from, is generated by converting a predetermined speaker mixed HMM. In this case, the output probability density function is a mixed Gaussian distribution having a 34-dimensional diagonal covariance matrix. Also, the word dictionary within a word dictionary memory 12 connected to the word checking section 4 stores symbol arrays showing the readings of phonemic HMMs within the phonemic HMM memory 11 each expressed by a symbol for each word.

Referring to FIG. 1, a speaker's utterance speech is inputted to a microphone 1, and it is converted into a speech signal, which is then inputted to a feature extraction section 2. After converting the inputted speech signal from analog to digital form, the feature extraction section 2 executes, for example, an LPC analysis to extract 34-dimensional feature parameters including the log power, 16-order cepstrum coefficients, $\Delta$ log power and 16-order $\Delta$ cepstrum coefficients. The time series of the extracted feature parameters is inputted to the word checking section 4 via a buffer memory 3.

The word checking section 4 detects a word hypothesis, and then, calculates and outputs a likelihood, by using the one-path Viterbi decoding method and based on the data of the feature parameters inputted via the buffer memory 3, with reference to the phonemic HMM 11 and the word dictionary 12. In this case, the word checking section 4 calculates the likelihood within the word and the likelihood from the utterance start for each HMM status at each time point. The likelihood is given independently for different word identification numbers, word start time points and preceding words. Also, for reduction of the calculation processing amount, there are reduced grid hypothesises each having lower likelihood out of all the likelihoods calculated based on the phonemic HMM 11 and the word dictionary 12. The word checking section 4 outputs information on the resulting word hypothesis and likelihood together with information on time from the utterance start time (concretely, e.g., a frame number) to a word hypothesis reduction section 6 via a buffer memory 5.

The word hypothesis reduction section 6 reduces the word hypothesises based on the word hypothesis outputted from the word checking section 4 via the buffer memory 5, by looking up to statistical language models within the statistical language model memory 22, with respect to the word hypothesises for the same word of an equal end time and different start times, for each leading-phoneme environment of the word, so that the word hypothesis is typified by one word hypothesis having the highest likelihood out of all the likelihoods calculated over a range from the utterance start time to the word end time, and then outputs, as a recognition result, the word string of the word hypothesis having the largest total likelihood out of all the word strings after the reduction. In the present preferred embodiment, preferably, the leading phoneme environment of the relevant word to be processed is defined as a string of three phonemes including the final phoneme of the word hypothesis that precedes the relevant word to be processed, and the first two phonemes of the word hypothesis of the relevant word to be processed.

Figure 2:
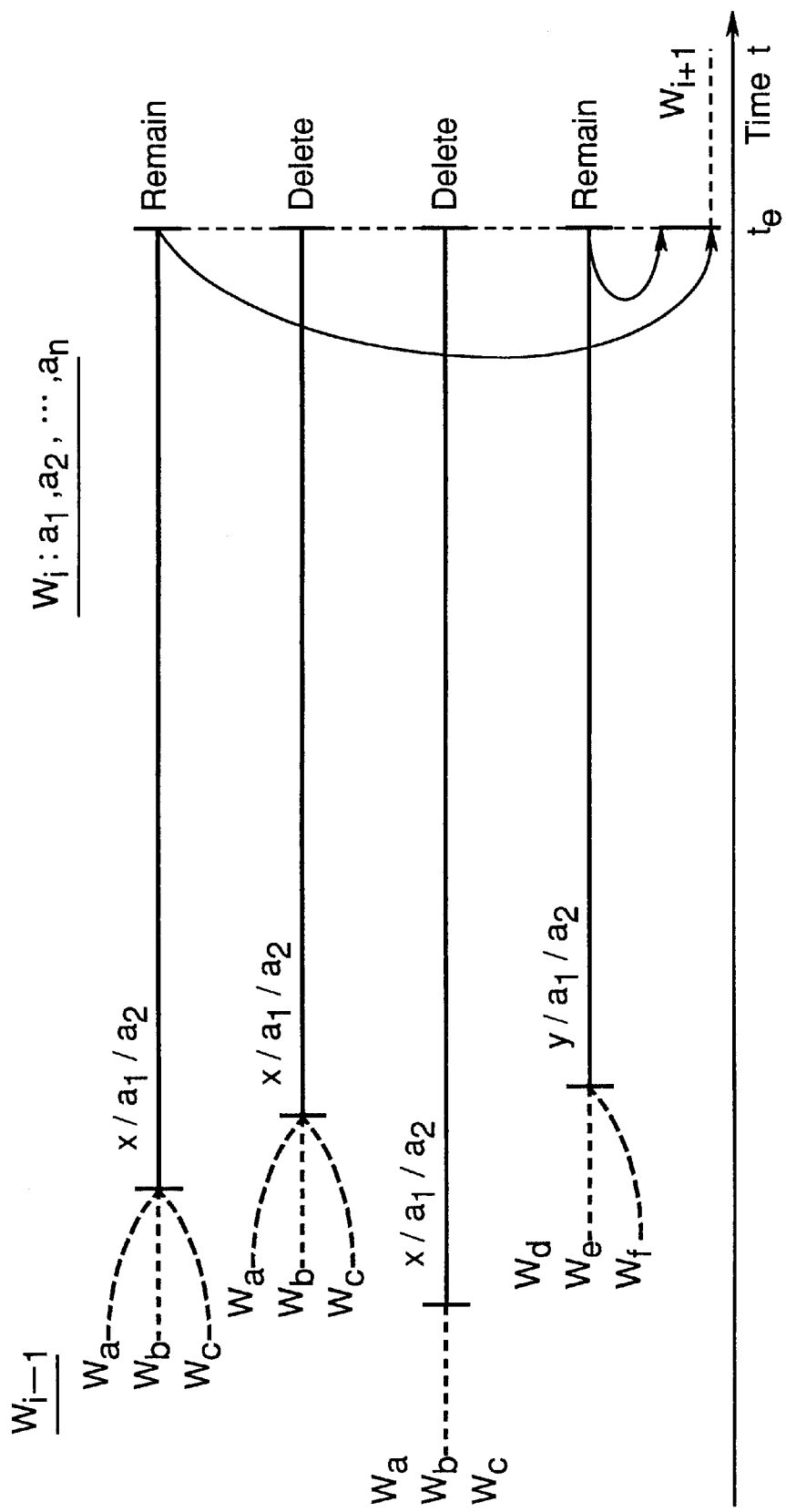
FIG. 2 is a timing chart showing the processing of a word hypothesis reduction section 6 in the continuous speech recognition apparatus of FIG. 1.

For example, as shown in FIG. 2, when the i-th word Wi comprising a phoneme string a1, a2, . . . , an comes next to the (i−1)-th word Wi−1, there are present six word hypothesises Wa, Wb, Wc, Wd, We and Wf as the word hypothesises of the word Wi−1. Now assume that the final phoneme of the first three word hypothesises Wa, Wb and Wc is /x/, and that the final phoneme of the last three word hypothesises Wd, We and Wf is /y/. The word hypothesises except for the word hypothesis having the highest total likelihood (e.g., the top word hypothesis in FIG. 2) out of word hypothesises each having the equal end time and the leading phoneme environment (the top three word hypothesises whose leading phoneme environment is "x/a1/a2" in FIG. 2) are deleted. In addition, since the fourth word hypothesis from the top differs in the leading phoneme environment, i.e., because the final phoneme of the preceding word hypothesis is not x but y, the fourth word hypothesis from the top is not deleted. That is, only one word hypothesis is left or is made to remain for each final phoneme of the preceding word hypothesis. In the example of FIG. 2, one word hypothesis is made to remain for the final phoneme /x/, and one word hypothesis is made to remain for the final phoneme /y/.

In the above-mentioned preferred embodiment, the leading phoneme environment of the relevant word to be processed is defined as a phoneme string including the final phoneme of the word hypothesis that precedes the relevant word to be processed, and the first two phonemes of the word hypothesises of the relevant word to be processed. However, in the present invention, without being limited to this, the phoneme string may be one including the final phoneme of the preceding word hypothesis, at least one phoneme of the preceding word hypothesis in succession to the final phoneme, and first phoneme of the word hypothesis of the relevant word to be processed.

In the above-mentioned preferred embodiment, the feature extraction section 2, the word checking section 4, the word hypothesis reduction section 6 and the statistical language model generator 20 are implemented by, for example, a digital computer or the other computer. The buffer memories 3 and 5, the phonemic HMM memory 11, the word dictionary memory 12, the training text data memory 21 and the statistical language model memory 22 are implemented by, for example, hard disk memories or the other storage devices.

In the above-mentioned preferred embodiment, speech recognition is performed by using the word checking section 4 and the word hypothesis reduction section 6. However, without being limited to this, the present invention may comprise a phoneme checking section which looks up, for example, to the phonemic HMM memory 11 and a speech recognizer which performs speech recognition, for example, by looking up to a statistical language model with the One Pass DP algorithm.

First Example

Application of the Class Bi-Multigam Learning Process to Strings of Letters

In this example, the input data is a string of letters formed by concatenating 10,000 spellings of words randomly selected among the ten spellings of the ten digits (zero, one, two, . . . nine) and by removing the blanks between them. It starts as follows:

"o n e s i x o n e e i g h t f i v e z e r o . . ."

The random selection of the spellings is constrained so that odd digits are always followed by even digits, and vice versa, even digits are always followed by odd digits. The pre-specified parameters are as follows:

(a) Maximum length of a sequence=5 letters;

(b) Number of classes=2; and (c) Minimum number of occurrences to discard a sequence=100.

At the initialization (k=0), relative counts of all the combinations of letters observed more than 100 times in the training data are assumed as initial bi-multigram probability values.

A sample of the initial (iteration k=0) bi-multigram probability distribution is shown in Table 2, where nb (.) denotes the number of occurrences of a sequence as follows:

TABLE 2

$p(n|o)$ = nb(on)/nb(o) = 0.08
$p(n\_e|o)$ = nb(one)/nb(o) = 0.06
.
.
.
$p(n\_e\_s\_i\_x|o)$ = nb(onesix)/nb(o) = 0.005
$p(e|o\_n)$ = nb(one)/nb(on) = 0.9
$p(e\_s|o\_n)$=n b(ones)/nb(on)=0.005
.
.
.

TABLE 2-continued $p(e\_s\_i\_x\_o|o\_n)$ = n b (onesixo)/nb(on) = 0.001
.
.
.
$p(s\_i\_x|o\_n\_e)$ = nb(onesix)/nb(one) = 0.05
.
.
.

This initial bi-multigram probability distribution is taken as an input for the classification process (step S3) is as follows:

The outcome of the classification into the following two classes:

(a) class definition at iteration parameter k=0 class 1={$e\_s\_i\_x\_o;e;e\_t\_w\_o:n\_e\_s\_i\_x$; . . . ;$f\_o\_o\_u\_r$;

$f\_o\_u\_r\_f$; . . . ;$g\_h\_t\_s:g\_h\_t\_o\_n\_e;e\_i\_g\_h\_t$} (40)

class2={$o\_n\_e;e\_s\_i\_x\_o;x;f\_i\_v\_e;t\_s\_e\_v;s\_e\_v\_e\_n$; . . . ;$x\_n\_i;x\_n\_i\_n\_e:n\_i\_n\_e$; . . . } (41)

(b) class-conditional distribution of the sequence at iteration k=0

$fp(e\_s\_i\_x\_o|$class 1$),p(e|$class 1$), p(o\_n\_e|$class 2$), p(e\_s\_i\_x\_o|$class 2$),$ (42)

(c) bigram distribution of the classes at iteration k=0

$p($class 1$|$class 2$)$=0.3

$p($class 2$|$class 1$)$=0.1 (43)

Then, the class distributions and the class definition, of iteration k=0, are taken as inputs, for the bi-multigram probability reestimation process (step S4). The outcome of the bi-multigram probability reestimation process is as follows:

$p(n|o)$=0.9

$p(n\_e|o)$=0.8

$p(n\_e\_s|o)$=0.05

$p(n\_e\_s\_i\_x|o)$=0 (44)

$p(e|o\_n)$=0.02

$p(e\_s|o\_n)$=0.001

$p(e\_s\_i\_x\_o|on)$=0

$p(s\_i\_x\_o\_n\_e)$=0.5 (45)

The classification process and the bi-multigram probability reestimation process are iterated alternately, till the likelihood of the input training string of letters converges. The final outcome of the learning procedure is as follows:

(a) most likely segmentation of the input string of letters:

"$o\_n\_e\_s\_i\_x\_o\_n\_e\_e\_i\_g\_h\_t\_f\_i\_v\_e\_z\_e\_r\_o$ . . ."

(b) class definition class 1={$o\_n\_e;t\_h\_r\_e\_e;f\_i\_v\_e;s\_e\_v\_e\_n;n\_i\_n\_e$} class 2={$z\_e\_r\_o;t\_w\_o;f\_o\_u\_r;s\_i\_x;e\_i\_g\_h\_t$} (46)

(c) class-conditional probability distribution $p(o\_n\_e|class\ 1)=0.2$ $p(t\_h\_r\_e\_e|class\ 1)=0.2$ $p(f\_i\_v\_e|class\ 1)=0.2$ $p(z\_e\_r\_o|class\ 2)=0.2$ $p(t\_w\_o|class\ 2)=0.2$ (47)

(d) bigram probability distribution $p(class\ 1|class\ 2)=1$ $p(class\ 2|class\ 1)=1$ (48)

Second Example
Application of the Class Bi-Multigram Learning Process to Strings of Words In this example, the input data is a string of words, i.e., sentences, coming from a database of natural language. The symbol <s> is used to mark the beginning of a sentence and </s> is used to mark the end of a sentence. An example of one sentence is as follows:

"<s> good afternoon new Washington hotel may i help you </s>"

At the initialization stage (k=0), the relative counts of all the combinations of words observed more than 30 times in the training data are assumed as initial bi-multigram probability values. A sample of the initial bi-multigram probabilities is shown on Table 3.

TABLE 3 p (afternoon|good)
= nb(good afternoon)/nb(good) = 0.08
p (afternoon\_new|good)
= nb(good afternoon/nb(good) = 0.06
p (good\_afternoon |<s>)
= nb(<s>good afternoon)/nb(<s>) = 0.06
.
.
.
p(</s>|may\_i\_help\_you)
= nb<may i help you </s>)/nb(may i help you)
= 0.005

The initial bi-multigram distribution shown in Table 3 is taken as an input for the classification process. The outcome of the classification consists of the initial partition of the sequences of words into 1,000 classes, the class conditional distribution of the sequences of words, the bigram distribution of the classes, at iteration k=0. The outcome of the classification from iteration k=0 is taken as an input for the reestimation of the bi-multigram distribution. The classification of the sequences and the reestimation of the bi-multigram distribution of the sequences are iterated alternately till the maximum number of iterations is performed.

The final output of the learning process is as follows:
(a) most likely segmentation of the input sentences:

"good\_afternoon new\_washington\_hotel may\_i\_help\_you"

(b) class definition class 1={good\_afternoon ; good\_morning;hello ; may\_i\_help\_you . . . } class 2={new\_washington\_hotel ; sheraton\_hotel ; plaza; . . . } class 1000={give\_me\_some ; tell\_me} (49)

(c) Class-conditional probability distribution $p(good\_afternoon|class\ 1)=0.03$ $p(good\_morning|class\ 1)=0.002$ $p(hello|class\ 1)=0.002$ (50)

(d) bigram distribution of the classes $p(class\ 2|class\ 1)=0.04$ $p(class\ 3|class\ 1)=0.005$ (51)

Experiments and Results

The present inventor carried out the following experiments in order to evaluate the performance of the apparatus of the preferred embodiment. First of all, the protocol of the experiments and the database used are described. A motivation or objective to learn bigram dependencies between variable length phrases is to improve the limitations of conventional word bigram models, while keeping the number of parameters in the model lower than in the word trigram case. Therefore, a relevant criterion to evaluate a bi-multigram model is to measure its power of prediction and its number of parameters, and to compare the results with those of conventional bigram and trigram models. The power of prediction is usually evaluated with the perplexity measure computed as follows:

$$PP=\exp\{-(1/T)\log(L(W))\} \quad (52),$$

where T is the number of words in a sentence W.

It is shown that the lower the perplexity PP is, the more accurate the prediction of the model is. In the case of a stochastic model, there are actually 2 perplexity values PP and PP* which can be calculated, depending on whether the likelihood L(W) in Equation (52) is computed as either:

$$L(W) = \sum_S L(W, S) \quad (53)$$

or approximated as $$L(W)=L(W,\ S^*)=\max L(W,\ S)\{S\} \quad (54)$$

The difference between the two perplexities, (PP*−PP), is always positive or zero, and measures the degree of ambiguity of a parse S of the sentence W, or equivalently the loss in terms of the prediction accuracy, when the sentence likelihood is approximated with the likelihood of the best parse, as is done in a speech recognizer.

In the following, the loss (PP*−PP) for a given estimation procedure is, first of all, evaluated, and then, the influence of the estimation procedure itself is studied by using either the forward-backward algorithm (Equation (15)), or its decision-oriented version (Equation (16)). Finally, results of these are compared with the ones obtained with conventional n-gram models. In order to achieve this object, a publicly known CMU tool kit attributed to Clarkson et al., 1997 is used. Experiments are run on "Travel Arrangement" data of the following table possessed by the present patent applicant.

TABLE 4

"Travel Arrangement" Data Processed by Present Applicant

|  | Train | Test |
|---|---|---|
| Number of sentences | 13650 | 2430 |
| Number of tokens | 167000 | 29000 (1% OOV) |
| Vocabulary | 3525 | +280 OOV |

Notes: The notation OOV is an abbreviation of out of vocabulary, and is defined as words that are not present in the vocabulary.

This database consists of spontaneous dialogues between a hotel clerk and a customer asking for travel and accommodation information. All the hesitation words and false starts were mapped to a single marker "*uh*". In these experiments, the maximum size of a phrase varied between n=one to four words (for n=1, bi-multigrams correspond to conventional bigrams). All the bi-multigram frequency probabilities are estimated with six iterations of training, and the dictionaries of phrases are pruned by discarding all sentences occurring less than twenty times at initialization, and less than 10 times after each iteration. In this case, using different pruning threshold values does not dramatically affect the results with the present data, provided that the threshold value at the initialization is in the range of 10 to 30, and that the threshold value of the iterations is about half less.

However, all the single-word phrases are maintained regardless of their estimated number of occurrences (if the phrases $s_i$ and $s_j$ are single-word phrases, and the reestimated value of $c(s_i\ s_j)$ falls to zero, then $c(s_i, s_j)$ is reset to 1), so that all word bigrams can be found in the final dictionary. Besides, all n-gram and phrase bigram probabilities are smoothed with the backoff smoothing technique by Katz (1987) using a publicly known Witten-Bell discounting by Witten et al. (1991). The Witten-Bell discounting was chosen, because it yielded the best perplexity scores with conventional n-grams on the present test data.

Next, the experiments with no clustering are described. First of all, with regard to the degree of non determinism, the perplexity values PP* and P obtained on ATR "travel arrangement" test data of Table 4 possessed by the present applicant after a forward-backward training are given in the following table. The difference (PP*−PP) between the perplexity values usually remains within about 1 point of perplexity, this meaning that relying on the single best parse should not deteriorate very much the accuracy of the prediction.

TABLE 5

Degree of No Determinism

| n | 1 | 2 | 3 | 4 |
|---|---|---|---|---|
| PP | 56.0 | 43.9 | 44.2 | 45.0 |
| PP* | 56.0 | 45.1 | 45.4 | 46.3 |

Next, with regard to influence of the estimation procedure, perplexity values PP* and model size using either the forward-backward algorithm or the Viterbi estimation algorithm are shown in the following table.

TABLE 6

Influence of Estimation Procedure:
Test Perplexity Values PP*

| n | 1 | 2 | 3 | 4 |
|---|---|---|---|---|
| FB method | 56.0 | 45.1 | 45.4 | 46.3 |
| Viterbi method | 56.0 | 45.7 | 45.9 | 46.2 |

TABLE 7

Influence of Estimation Procedure:
Model Size

| n | 1 | 2 | 3 | 4 |
|---|---|---|---|---|
| FB method | 32505 | 44382 | 43672 | 43186 |
| Viterbi method | 32505 | 65141 | 67258 | 67295 |

As apparent from Tables 6 and 7, as far as perplexity values are concerned, the estimation scheme seems to have very little influence, with only a slight advantageous effect in using the forward-backward training. On the other hand, the size of the model, measured as the number of distinct bi-multigrams at the end of the training, is about 30% less with the forward-backward training, i.e., approximately 40,000 versus 60,000, for the same test perplexity value.

The bi-multigram results tend to indicate that heuristic knowledge for the pruning used to discard phrases does not allow overtraining to be fully avoided. Indeed, perplexity values with n=3 and 4 (which means dependencies possibly spanning over six or eight words) are higher than with n=2 (dependencies limited to four words). The other strategies, possibly penalizing more the long phrases than the short ones, should be worked on.

Further, in comparison with n-grams, perplexity values (PP) and model size for n-grams, and bi-multigrams issued from a forward-backward training are shown in the following tables.

TABLE 8

Comparison with n-grams:
Test perplexity values PP

| Value n | 1 | 2 | 3 | 4 |
|---|---|---|---|---|
| n-gram | 314.2 | 56.0 | 40.4 | 39.8 |
| bi-multigrams | 56.0 | 43.9 | 44.2 | 45.0 |

TABLE 9

Comparison with n-grams:
Model size

| Value n | 1 | 2 | 3 | 4 |
|---|---|---|---|---|
| n-gram | 3526 | 32505 | 75511 | 112148 |
| bi-multigrams | 32505 | 44382 | 43672 | 43186 |

As apparent from Tables 8 and 9, the lowest bi-multigram perplexity score (43.9) is still higher than the trigram value, but it is much closer to the trigram value (40.4) than to the bigram one (56.0). Besides, the trigram score depends on the discounted scheme. With a linear discounting, the trigram perplexity on the present test data was 48.1.

The 5-gram perplexity value (not shown in the table) is 40.8, slightly more than the 4-gram score, which is consistent with the fact that the bi-multigram perplexity does not decrease for n>2 (i.e., for dependencies spanning over more than 4 words). Finally, the number of entries in the bi-multigram model is much less than the number of entries in the trigram model (45000 versus 75000), which illustrates the tradeoff between the accuracy of the model and its size that the multigrams tend to achieve.

Further, the experiments and experiment results with clustering are described. In these experiments, clustering the phrases does not improve the perplexity scores. The increase in perplexity remains very limited (less than 1 point) when only a moderate fraction of the phrases (10 to 20%) are clustered, but beyond this, clustering the phrases severely deteriorates the perplexity. This effect is often reported also within the n-gram framework, when the class estimates are not interpolated with the word estimates. However, clustering phrases may provide a natural way to deal with some of the language disfluencies which characterize spontaneous utterances, like the insertion of hesitation words for instance. In order to illustrate this point, the phrases which are merged, first of all, during the training of a model allowing phrases of up to n=4 words are listed in the following table (the phrases containing the hesitation marker "*uh*" are in the upper part of this table). The differences of phrases mainly resulting from a speaker hesitation are often merged together.

TABLE 10

Example of Merged Phrases
with Model Allowing Up To Four Word Sequences

{yes_that_will;*uh*_that_would}
{yes_that_will_be;*uh*_yes_that's}
{*uh*_by_the;and_by_the }
{yes_*uh*_i;i_see_i}
{okay_i_understand;*uh*_yes_please}
{could_you_recommend;*uh*_is_there}
{*uh*_could_you_tell;and_could_you_tell}
{so_that_will;yes_that_will;yes_that_would;uh*_that_would}
{if_possible_i'd_like;we_would_like;*uh*_i_want}
{that_sounds_good;*uh*_i_understand}
{*uh*_i_really;*uh*_i_don't}
{*uh*_i'm_staying;and_i'm_staying}
{all_right_we;*uh*_yes_i}
{good_morning_this;good_afternoon_this}
{yes_i_do;yes_thank_you}
{we'll_be_looking_forward;we_look_forward}
{dollars_a_night;and_forty_yen}
{for_your_help; for_your_information}
{hold_the_line;wait_for_a_moment}
{yes_that_will_be;and_could_you_tell}
{please_go_ahead;you_like_to_know}
{what_time_would_you; and_you_would}
{yes_there_is;but_there_is}
{join_phillips_in_room;ms._skuzzy_in}
{name_is_suzuki;name_is_ms._suzuki}
{i'm_calling_from;also_ i'd_like}
{much_does_it_cost;can_reach_you}
{thousand_yen_room; dollars_per_person}
{yes_i_do;yes_thank_you;i_see_sir}
{you_tell_me_where;you_tell_me_what}
{a_reservation_for_the;the_reservation_for}
{your_name_and_the;you_give_me_the}
{amy_harris_in;is_amy_harris_in}
{name_is_mary_phillips;name_is_kazuo_suzuki}
{hold_on_a_moment;wait_a_moment}
{give_me_some;also_tell_me}

The above-mentioned table also illustrates another motivation for phrase retrieval and clustering, apart from word prediction, which is to address issues related to topic identification, dialogue modeling and language understanding, according to Kawahara et al. (1997). Indeed, though the clustered phrases in these experiments were derived fully blindly, i.e., with no semantic and pragmatic information, intra-class phrases often display a strong semantic correlation. However, in order to make this approach effectively usable for speech understanding, constraints should be placed on the phrase clustering process, using some higher level information, like speech act tags for instance.

As described above, an algorithm to derive variable-length phrases assuming n-gram dependencies between the phrases has been proposed and evaluated for a language modeling task. Experiments on a task oriented corpus have shown that structuring sentences into phrases could allow the bigram perplexity value to be greatly reduced, while still keeping the number of entries in the language model much lower than in a trigram model. However, these results might be further improved with a more efficient pruning strategy allowing even longer dependencies to be learned without over-training. Beside, it has been shown how a paradigmatic aspect could easily be integrated within this framework, allowing common labels to be assigned to phrases having different lengths. The semantic relevance of the phrase merges incites to use this approach in the areas of dialogue modeling and of language understanding. In that case, semantic and pragmatic information could be used to constrain the class derivation process.

Extension of the Preferred Embodiments

In the above-mentioned embodiments, the class bi-multigram learning procedure is applied to either strings of letters or strings of words (i.e., sentences), in which cases the sequences are either sequences of letters or sequences of words (i.e., phrases). The class bi-multigram learning is not limited to these cases, and it can be applied to any input strings of discrete-valued units: for example, strings of Chinese characters, strings of DNA symbols, strings of digits, . . . etc.

Advantageous Effects of the Preferred Embodiments According to the Invention

The advantageous effects of the preferred embodiments according to the present invention are as follows:

(A) The preferred embodiments according to the present invention allows to learn both a sequence structure and a class structure, with bigram dependencies assumed between the sequences and class labels assigned to the sequences, from input strings of discrete-valued units, in such a way that the sequence structure and the class structure are jointly optimized so as to maximize the likelihood of the training data. This is an advantage over prior art, where the class structure and the sequence structure are optimized independently so that there is no guarantee that the obtained values are optimal with respect to each other.

(B) The preferred embodiments according to the present invention allows to learn both a sequence structure and a class structure, with bigram dependencies assumed between the sequences and class labels assigned to the sequences, from input strings of discrete-valued units, by using an EM procedure implemented with a forward-backward algorithm, for which monotone convergence towards a (possibly local) optimum is theoretically guaranteed. This is an advantage over prior art where a sequence structure, with bigram dependencies being assumed between the sequences, is learnt by using heuristic procedures such as a greedy algorithm for instance, for which monotone convergence towards a (possibly local) optimum is not theoretically guaranteed.

(C) The preferred embodiments according to the present invention allows to learn both a sequence structure and a class structure, with bigram dependencies assumed between the sequences and class labels assigned to the sequences, from input strings of discrete-valued units, with a stochastic model, so that there remains an ambiguity, i.e., some degree of freedom, on the parse of the input strings. This is an advantage over prior art where a sequence structure, with bigram dependencies being assumed between the sequences, is learnt with a deterministic model, so that there remains no ambiguity, i.e., no degree of freedom, on the parse of the input strings. As it allows some degree of freedom on the parse of the input strings, the stochastic model can be expected to evidence better generalization capabilities than the deterministic models of prior art.

(D) The preferred embodiments according to the present invention allows to learn both a sequence structure and a class structure, with bigram dependencies assumed between the sequences and class labels assigned to the sequences, from input strings of discrete-valued units, by clustering the sequences regardless of their length. As a result, sequences of different lengths can be assigned the same cluster. This is an advantage over prior art where sequences of the same length only can be assigned the same class label, since, in prior art, the classes of sequences are defined as sequences of unit class labels.

Therefore, according to the preferred embodiments of the present invention, there can be provided an apparatus to learn a statistical class sequence model, an apparatus to learn a statistical class phrase base language model, a speech recognition apparatus using the statistical class phrase base language model, where the above-mentioned apparatus allow to optimize jointly both the sequence and the phrase structures, by using an EM algorithm the monotone convergence of which towards a (possibly local) optimum is theoretically guaranteed, and where the above-mentioned apparatus allow to stochastically parse the input data, and to assign a common class label to sequences of different lengths, as compared with prior art. As a result of these advantages, the present invention enables to perform speech recognition by finding a better trade-off between the complexity of the decoding (as measured by the size of the statistical language model) and the expected accuracy of the decoding (as measured by the perplexity score which represents the predictive capability of the statistical language model), in comparison with the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for generating a statistical class sequence model called a class bi-multigram model from input strings of discrete-valued units, where bigram dependencies are assumed between adjacent multigrams, where each said multigram is a variable length sequence of maximum length N units, and where class labels are assigned to the sequences, said apparatus comprising:

initialization means for taking as an input a training string of units, registering in an inventory of sequences all the combinations of 1 to N units occurring in the input training string, counting the number of times all sequences of units occur and the number of times all pairs of sequences of units co-occur in the input training strings of units, computing an initial bigram probability distribution of all the pairs of sequences as the counted number of times the two sequences co-occur divided by the counted number of times the first sequence occurs in the input training string, and outputting the inventory of sequences and the initial bigram probability distribution of the sequences in the inventory;

classification means for taking as an input the inventory of sequences and the bigram probability distribution of the sequences in the inventory, classifying the input sequences into a pre-specified desired number of classes, by first assigning each sequence to its own class, and then repeatedly updating a class conditional probability distribution of the sequences and the bigram probability distribution of the classes and merging the pairs of classes for which a loss in mutual information computed with the current class probability distributions is minimal, until a desired number of classes is obtained, and outputting the inventory of sequences with the class label assigned to each sequence, the class conditional probability distribution of the sequences, and the bigram probability distribution of the classes;

reestimation means for taking as an input the training string of units, the inventory of sequences with the class label assigned to each sequence, the current class conditional probability distribution of the sequences, and the current bigram probability distribution of the classes which are outputted from said classification means, calculating an estimate of the bigram probability distribution of the sequences by using an EM algorithm to maximize the likelihood of the input training string computed with associated input probability distributions, and outputting the inventory of sequences with the bigram probability distribution of the sequences, the process of said reestimation means being performed with a forward-backward algorithm, by using an equation where a bigram probability between a sequence to be processed and a preceding sequence is calculated from a forward likelihood of the input training string which can be taken forward in a time series, the class conditional probability of the sequences to be processed, the probability of the class of the sequence to be processed knowing the class of the preceding sequence, and a backward likelihood of the input training string which can be taken backward in the time series; and control means for controlling said classification means and said reestimation means to iteratively execute the process of said classification means and said reestimation means, the input of said classification means being, at a first iteration, the output of the said initialization means, and, during subsequent iterations, the output of said reestimation means, and the input of said reestimation means being the output of said classification means, until a predetermined ending condition is satisfied, thereby generating a statistical class sequence model.

2. The apparatus as claimed in claim 1, wherein said initialization means withdraws from the inventory of registered sequences, the sequences occurring a number of times which is less than a prespecified number of times in the input training string of units.

3. The apparatus as claimed in claim 2, wherein the ending condition is that iterations, each including of the process of said classification means and the process of said reestimation means, have been performed a pre-specified number of times.

4. The apparatus as claimed in claim 2,
wherein said classifications means classifies the sequences into a pre-specified number of classes by applying the Brown algorithm to an input bigram probability distribution of the sequences computed by said initialization means at the first iteration, and by said reestimation means during the subsequent iterations.

5. The apparatus as claimed in claim 4,
wherein said equation is an equation for calculating the bigram probability between two sequences of units including first and second sequences, where the first sequences of units is followed by the second sequence of units which is a sequence of units to be processed, for each sequence of units to be processed in the input training string of units; and
wherein the bigram probability between two sequences of units is obtained by dividing the sum of the likelihoods of all the segmentations containing the first and the second sequences of units, by the sum of the likelihoods of all the segmentation containing the first sequence of units.

6. The apparatus as claimed in claim 5,
wherein said equation has a denominator representing the average number of occurrences of each sequence of units in the input training string of units, and a numerator representing the average number of co-occurrences of each pair of sequences of units where the first sequence of units is followed by the second sequence of units in the input training strings of units,
wherein said numerator is the sum of the products of the forward likelihood of the input training string of units, the class conditional probability of the sequence to be processed, the probability of the class of the sequence to be processed conditioned by the class of the sequence preceding the sequence of units to be processed, and the backward likelihood of the input training string of units; and
wherein said denominator is the sum for all the sequences in the inventory of the products of the forward likelihood of the input training string of units, the class conditional probability of the sequence, the probability of the class of the sequence conditioned by the class of the sequence preceding the sequence of units to be processed, and the backward likelihood of the input training string of units.

7. The apparatus as claimed in claim 4,
wherein the ending condition is that iterations, each including of the process of said classification means and the process of said reestimation means, have been performed a pre-specified number of times.

8. The apparatus as claimed in claim 2,
wherein said equation is an equation for calculating the bigram probability between two sequences of units including first and second sequences, where the first sequences of units is followed by the second sequence of units which is a sequence of units to be processed, for each sequence of units to be processed in the input training string of units; and
wherein the bigram probability between two sequences of units is obtained by dividing the sum of the likelihoods of all the segmentations containing the first and the second sequences of units, by the sum of the likelihoods of all the segmentations containing the first sequence of units.

9. The apparatus as claimed in claim 8,
wherein said equation has a denominator representing the average number of occurences of each sequence of units in the input training string of units, and a numerator representing the average number of co-occurences of each pair of sequences of units where the first sequence of units is followed by the second sequence of units in the input training strings of units,
wherein said numerator is the sum of the products of the forward likelihood of the input training string of units, the class conditional probability of the sequence to be processed, the probability of the class of the sequence to be processed conditioned by the class of the sequence preceding the sequence of units to be processed, and the backward likelihood of the input training string of units; and
wherein said denominator is the sum for all the sequences in the inventory of the products of the forward likelihood of the input training string of units, the class conditional probability of the sequence, the probability of the class of the sequence conditioned by the class of the sequence preceding the sequence of units to be processed, and the backward likelihood of the input training string of units.

10. The apparatus as claimed in claim 1,
wherein said classification means classifies the sequences into a pre-specified number of classes by applying the Brown algorithm to an input bigram probability distribution of the sequences computed by said initialization means at the first iteration, and by said reestimation means during the subsequent iterations.

11. The apparatus as claimed in claim 10,
wherein said equation is an equation for calculating the bigram probability between two sequences of units including first and second sequences, where the first sequences of units is followed by the second sequence of units which is a sequence of units to be processed, for each sequence of units to be processed in the input training string of units; and
wherein the bigram probability between two sequences of units is obtained by dividing the sum of the likelihoods of all the segmentations containing the first and the second sequences of units, by the sum of the likelihoods of all the segmentations containing the first sequence of units.

12. The apparatus as claimed in claim 11,
wherein said equation has a denominator representing the average number of occurrences of each sequence of units in the input training string of units, and a numerator representing the average number of co-occurrences of each pair of sequences of units where the first sequence of units is followed by the second sequence of units in the input training strings of units,
wherein said numerator is the sum of the products of the forward likelihood of the input training string of units, the class conditional probability of the sequence to be processed, the probability of the class of the sequence to be processed conditioned by the class of the sequence preceding the sequence of units to be processed, and the backward likelihood of the input training string of units; and
wherein said denominator is the sum for all the sequences in the inventory of the products of the forward likelihood of the input training string of units, the class conditional probability of the sequence, the probability of the class of the sequence conditioned by the class of the sequence preceding the sequence of units to be processed, and the backward likelihood of the input training string of units.

13. The apparatus as claimed in claim 10,
wherein the ending condition is that iterations, each including of the process of said classification means and the process of said reestimation means, have been performed a pre-specified number of times.

14. The apparatus as claimed in claim 1,
wherein said equation is an equation for calculating the bigram probability between two sequences of units including first and second sequences, where the first sequences of units is followed by the second sequence of units which is a sequence of units to be processed, for each sequence of units to be processed in the input training string of units; and
wherein the bigram probability between two sequences of units is obtained by dividing the sum of the likelihoods of all the segmentations containing the first and the second sequences of units, by the sum of the likelihoods of all the segmentations containing the first sequence of units.

15. The apparatus as claimed in claim 14,
wherein said equation has a denominator representing the average number of occurences of each sequence of units in the input training string of units, and a numerator representing the average number of co-occurences of each pair of sequences of units where the first sequence of units is followed by the second sequence of units in the input training strings of units,
wherein said numerator in the sum of the products of the forward likelihood of the input training string of units, the class conditional probability of the sequence to be processed, the probability of the class of the sequence to be processed conditioned by the class of the sequence preceding the sequence of units to be processed, and the backward likelihood of the input training string of units; and
wherein said denominator is the sum for all the sequences in the inventory of the products of the forward likelihood of the input training string of units, the class conditional probability of the sequence, the probability of the class of the sequence conditioned by the class of the sequence preceding the sequence of units to be processed, and the likelihood of the input training string of units.

16. The apparatus as claimed in claim 1,
wherein the ending condition is that iterations, each including of the process of said classifications means and the process of said reestimation means, have been performed a pre-specified number of times.

17. An apparatus for generating a statistical language model, said apparatus comprising:
an apparatus for generating a statistical class sequence model called a class bi-multigram model from input strings of discrete-valued units, where bigram dependencies are assumed between adjacent variable length sequences of maximum length N units, and where class labels are assigned to the sequences,
wherein said apparatus for generating a statistical class sequence model comprises:
initialization means for taking as an input a training string of units, registering in an inventory of sequences all the combinations of 1 to N units occurring in the input training string, counting the number of times all sequences of units occur and the number of times all pairs of sequences of units co-occur in the input training string, computing an initial bigram probability distribution of all the pairs of sequences as the counted number of times the two sequences co-occur divided by the counted number of times the first sequence occurs in the input training string, and outputting the inventory of sequences and the initial bigram probability distribution of the sequences in the inventory;
classification means for taking as an input the inventory of sequences and the bigram probability distribution of the sequences in the inventory, classifying the input sequences into a pre-specified desired number of classes, by first assigning each sequence to its own class, and then repeatedly updating a class conditional probability distribution of the sequences and the bigram probability distribution of the classes and merging the pairs of classes for which a loss in mutual information computed with a current class probability distributions is minimal, until a desired number of classes is obtained, and outputting the inventory of sequences with the class label assigned to each sequence, the class conditional probability distribution of the sequences, and the bigram probability distribution of the classes;
reestimation means for taking as an input the training string, the inventory of sequences with the class label assigned to each sequence, the current class conditional probability distribution of the sequences, and a current bigram probability distribution of the classes which are outputted from said classification means, calculating an estimate of the bigram probability distribution of the sequences by using an EM algorithm to maximize the likelihood of the input training string computed with the input probability distributions, and outputting the inventory of sequences with the bigram probability distribution of the sequences, the process of said reestimation means being performed with a forward-backward algorithm, by using an equation where a bigram probability between a sequence to be processed and a preceding sequence is calculated from a forward likelihood of the input training string which can be taken forward in a time series, the class conditional probability of the sequence to be processed, the probability of the class of the sequence to be processed knowing the class of the preceding sequence, and the backward likelihood of the input training string which can be taken backward in the time series; and
control means for controlling said classification means and said reestimation means to iteratively execute the process of said classification means and said reestimation means, the input of said classification means being, at a first iteration, the output of the said initialization means, and, during subsequent iterations, the output of said reestimation means, and the input of said reestimation means being the output of said classification means, until a predetermined ending condition is satisfied, thereby generating a statistical class sequence model,
wherein each of said units in said input training string is a letter of an alphabet of a natural language,
wherein each of said sequences is a morphem or a word,
wherein said classification means classifies sequences of letters into a pre-specified number of classes of sequences of letters, and wherein said statistical sequence model is a statistical language model.

18. The apparatus as claimed in claim 17, wherein said initialization means withdraws from the inventory of registered sequences, the sequences occurring a number of times which is less than a pre-specified number of times in the input training string of units.

19. The apparatus as claimed in claim 18, wherein said classification means classifies the sequences into a pre-specified number of classes by applying the Brown algorithm to an input bigram probability distribution of the sequences computed by said initialization means at the first iteration, and by said reestimation means during the subsequent iterations.

20. The apparatus as claimed in claim 17, wherein said classification means classifies the sequences into a pre-specified number of classes by applying the Brown algorithm to an input bigram probability distribution of the sequences computed by said initialization means at the first iteration, and by said reestimation means during the subsequent iterations.

21. An apparatus for generating a statistical language model, said apparatus comprising:
an apparatus for generating a statistical class sequence model called class bi-multigram model from input strings of discrete-valued units, where bigram dependencies are assumed between adjacent variable length sequences of maximum length N units, and where class labels are assigned to the sequences,
wherein said apparatus for generating a statistical class sequence model comprises:
initialization means for taking as an input a training string of units, registering in an inventory of sequences all the combinations of 1 to N units occurring in the input training string, counting the number of times all sequences of units occur and the number of times all pairs of sequences of units co-occur in the input training strings, computing an initial bigram probability distribution of all the pairs of sequences as the counted number of times the two sequences co-occur divided by the counted number of times the first sequence occurs in the input training string, and outputting the inventory of sequences and the initial bigram probability distribution of the sequences in the inventory;
classification means for taking as an input the inventory of sequences and the bigram probability distribution of the sequences in the inventory, classifying the input sequences into a pre-specified desired number of classes, by first assigning each sequence to its own class, and then repeatedly updating the class conditional probability distribution of the sequences and the bigram probability distribution of the classes and merging the pairs of classes for which a loss in mutual information computed with the current class probability distributions is minimal, until a desired number of classes is obtained, and outputting the inventory of sequences with the class label assigned to each sequence, the class conditional probability distribution of the sequences, and the bigram probability distribution of the classes;
reestimation means for taking as an input the training string of units, the inventory of sequences with the class label assigned to each sequence, a current class conditional probability distribution of the sequences, and a current bigram probability distribution of the classes which are outputted from said classification means, calculating an estimate of the bigram probability distribution of the sequences by using an EM algorithm to maximize a likelihood of the input training string computed with the associated input probability distributions, and outputting the inventory of sequences with the bigram probability distribution of the sequences, the process of said reestimation means being performed with a forward-backward algorithm, by using an equation where a bigram probability between a sequence to be processed and a preceding sequence is calculated from a forward likelihood of the input training string which can be taken forward in a time series, the class conditional probability of the sequence to be processed, the probability of the class of the sequence to be processed knowing the class of the preceding sequence, and the backward likelihood of the input training string which can be taken backward in the time series; and
control means for controlling said classification means and said reestimation means to iteratively execute the process of said classification means and said reestimation means, the input of said classification means being, at a first iteration, the output of the said initialization means, and, during subsequent iterations, the output of said reestimation means, and the input of said reestimation means being the output of said classification means, until a predetermined ending condition is satisfied, thereby generating a statistical class sequence model,
wherein each of said units in said input training string is a word of a natural language,
wherein each of said sequences is a phrase,
wherein said classification means classifies sequences of letters into a pre-specified number of classes of sequences of phrases, and
wherein said statistical sequence model is a statistical language model.

22. The apparatus as claimed in claim 21, wherein said initialization means withdraws from the inventory of registered sequences, the sequences occurring a number of times which is less than a pre-specified number of times in the input training string of units.

23. The apparatus as claimed in claim 22, wherein said classification means classifies the sequences into a pre-specified number of classes by applying the Brown algorithm to an input bigram probability distribution of the sequences computed by said initialization means at the first iteration, and by said reestimation means during the subsequent iterations.

24. The apparatus as claimed in claim 21, wherein said classification means classifies the sequences into a pre-specified number of classes by applying the Brown algorithm to an input bigram probability distribution of the sequences computed by said initialization means at the first iteration, and by said reestimation means during the subsequent iterations.

25. A speech recognition apparatus comprising speech recognition means for recognizing speech by using a predetermined statistical language model based on an input speech utterance, said apparatus comprising an apparatus for generating a statistical class sequence model called a class bi-multigram model from input strings of discrete-valued units, where bigram dependencies are assumed between adjacent variable length sequences of maximum length N units, and where class labels are assigned to the sequences,
wherein said apparatus for generating a statistical class sequence model comprises:
initialization means for taking as an input a training string of units, registering in an inventory of sequences all the combinations of 1 to N units occurring in the input training string, counting the number of times all sequences of units occur and the number of times all pairs of sequences of units co-occur in the input training strings, computing an initial bigram probability distribution of all the pairs of sequences as the counted number of times the two sequences co-occur divided by the counted number of times the first sequence occurs in the input training string, and outputting the inventory of sequences and the initial bigram probability distribution of the sequences in the inventory;
classification means for taking as an input the inventory of sequences and the bigram probability distribution of the sequences in the inventory, classifying the input sequences into a pre-specified desired number of classes, by first assigning each sequence to its own class, and then repeatedly updating a class conditional probability distribution of the sequences and the bigram probability distribution of the classes and merging the pairs of classes for which a loss in mutual information computed with the current class probability distributions is minimal, until a desired number of classes is obtained, and outputting the inventory of sequences with the class label assigned to each sequence, the class conditional probability distribution of the sequences, and the bigram probability distribution of the classes;
reestimation means for taking as an input the training string of units, the inventory of sequences with the class label assigned to each sequence, a current class conditional probability distribution of the sequences, and a current bigram probability distribution of the classes which are outputted from said classification means, calculating an estimate of the bigram probability distribution of the sequences by using an EM algorithm to maximize a likelihood of the input training string computed with the input probability distributions, and outputting the inventory of sequences with the bigram probability distribution of the sequences, the process of said reestimation means being performed with a forward-backward algorithm, by using an equation where a bigram probability between a sequence to be processed and a preceding sequence is calculated from a forward likelihood of the input training string which can be taken forward in a time series, the class conditional probability of the sequence to be processed, the probability of the class of the sequence to be processed knowing the class of the preceding sequence, and a backward likelihood of the input training string which can be taken backward in the time series; and
control means for controlling said classification means and said reestimation means to iteratively execute the process of said classification means and said reestimation means, the input of said classification means being, at the first iteration, the output of the said initialization means, and, during subsequent iterations, the output of said reestimation means, and the input of said reestimation means being the output of said classification means, until a predetermined ending condition is satisfied, thereby generating a statistical class sequence model,
wherein each of said units in said input training string is a letter of an alphabet of a natural language,
wherein each of said sequences is a morphem or a word,
wherein said classification means classifies sequences of letters into a pre-specified number of classes of sequences of letters, and
wherein said statistical sequence model is a statistical language model, and
wherein said speech recognition means recognizes speech with reference to the statistical language model generated by said apparatus for generating the statistical language model based on the input speech utterance, and outputting a speech recognition result.

26. The apparatus as claimed in claim 25,
wherein said initialization means withdraws from the inventory of registered sequences, the sequences occurring a number of times which is less than a pre-specified number of times in the input training string of units.

27. The apparatus as claimed in claim 26,
wherein said classification means classifies the sequences into a pre-specified number of classes by applying the Brown algorithm to an input bigram probability distribution of the sequences computed by said initialization means at the first iteration, and by said reestimation means during the subsequent iterations.

28. The apparatus as claimed in claim 25,
wherein said classification means classifies the sequences into a pre-specified number of classes by applying the Brown algorithm to an input bigram probability distribution of the sequences computed by said initialization means at the first iteration, and by said reestimation means during the subsequent iterations.

29. A speech recognition apparatus comprising speech recognition means for recognizing speech by using a predetermined statistical language model based on an input speech utterance, said apparatus comprising an apparatus for generating a statistical class sequence model called a class bi-multigram model from input strings of discrete-valued units, where bigram dependencies are assumed between adjacent variable length sequences of maximum length N units, and where class labels are assigned to the sequences,
wherein said apparatus for generating a statistical class sequence model comprises:
initialization means for taking as an input a training string of units, registering in an inventory of sequences all the combinations of 1 to N units occurring in the input training string, counting the number of times all sequences of units occur and the number of times all pairs of sequences of units co-occur in the input training strings, computing an initial bigram probability distribution of all the pairs of sequences as the counted number of times the two sequences co-occur divided by the counted number of times the first sequence occurs in the input training string, and outputting the inventory of sequences and the initial bigram probability distribution of the sequences in the inventory;
classification means for taking as an input the inventory of sequences and a bigram probability distribution of the sequences in the inventory, classifying the input sequences into a pre-specified desired number of classes, by first assigning each sequence to its own class, and then repeatedly updating a class conditional probability distribution of the sequences and a bigram probability distribution of the classes and merging the pairs of classes for which a loss in mutual information computed with current class probability distributions is minimal, until a desired number of classes is obtained, and outputting the inventory of sequences with the class label assigned to each sequence, the class conditional probability distribution of the sequences, and the bigram probability distribution of the classes;

reestimation means for taking as an input the training string, the inventory of sequences with the class label assigned to each sequence, the current class conditional probability distribution of the sequences, and the current bigram probability distribution of the classes which are outputted from said classification means, calculating an estimate of the bigram probability distribution of the sequences by using an EM algorithm to maximize a likelihood of the input training string computed with the input probability distributions, and outputting the inventory of sequences with the bigram probability distribution of the sequences, the process of said reestimation means being performed with a forward-backward algorithm, by using an equation where a bigram probability between a sequence to be processed and a preceding sequence is calculated from a forward likelihood of the input training string which can be taken forward in a time series, the class conditional probability of the sequence to be processed, the probability of the class of the sequence to be processed knowing the class of the preceding sequence, and a backward likelihood of the input training string which can be taken backward in the time series; and control means for controlling said classification means and said reestimation means to iteratively execute the process of said classification means and said reestimation means, the input of said classification means being, at a first iteration, the output of the said initialization means, and, during subsequent iterations, the output of said reestimation means, and the input of said reestimation means being the output of said classification means, until a predetermined ending condition is satisfied, thereby generating a statistical class sequence model, wherein each of said units in said input training string is a word of a natural language, wherein each of said sequences is a phrase, wherein said classification means classifies sequences of letters into a pre-specified number of classes of sequences of phrases, and wherein said statistical sequence model is a statistical language model, and wherein said speech recognition means recognizes speech with reference to the statistical language model generated by said apparatus for generating the statistical language model based on the input speech utterance, and outputting a speech recognition result.

30. The apparatus as claimed in claim 29, wherein said initialization means withdraws from the inventory of registered sequences, the sequences occurring a number of times which is less than a pre-specified number of times in the input training string of units.

31. The apparatus as claimed in claim 30, wherein said classification means classifies the sequences into a pre-specified number of classes by applying the Brown algorithm to an input bigram probability distribution of the sequences computed by said initialization means at the first iteration, and by said reestimation means during the subsequent iterations.

32. The apparatus as claimed in claim 29, wherein said classification means classifies the sequences into a pre-specified number of classes by applying the Brown algorithm to an input bigram probability distribution of the sequences computed by said initialization means at the first iteration, and by said reestimation means during the subsequent iterations.

* * * * *

UNITED STATES PATENT AND TRADEMARK OFFICE
CERTIFICATE OF CORRECTION

PATENT NO.   : 6,314,399 B1
DATED        : November 6, 2001
INVENTOR(S)  : Sabine Deligne et al.

It is certified that error appears in the above-identified patent and that said Letters Patent is hereby corrected as shown below:

<u>Title page,</u>
Item [73], Assignee, please change "ATR Interpreting Telecommunications Research, Kyoto (JP)" to -- ATR Interpreting Telecommunications Research Laboratories, Kyoto (JP) --.

Signed and Sealed this

Twentieth Day of August, 2002

Attest:

Attesting Officer

JAMES E. ROGAN
*Director of the United States Patent and Trademark Office*